US010270339B2

(12) United States Patent
Lee et al.

(10) Patent No.: US 10,270,339 B2
(45) Date of Patent: Apr. 23, 2019

(54) DC-DC CONVERTER, CHARGER INTEGRATED CIRCUIT AND ELECTRONIC DEVICE HAVING THE SAME AND BATTERY CHARGING METHOD THEREOF

(71) Applicants: Kwang Chan Lee, Hwaseong-si (KR);
Sanghee Kang, Hwaseong-si (KR);
Jungwook Heo, Yongin-si (KR);
Sungwoo Lee, Suwon-si (KR);
Daewoong Cho, Seoul (KR)

(72) Inventors: Kwang Chan Lee, Hwaseong-si (KR);
Sanghee Kang, Hwaseong-si (KR);
Jungwook Heo, Yongin-si (KR);
Sungwoo Lee, Suwon-si (KR);
Daewoong Cho, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 356 days.

(21) Appl. No.: 14/964,071

(22) Filed: Dec. 9, 2015

(65) Prior Publication Data
US 2016/0254689 A1    Sep. 1, 2016

(30) Foreign Application Priority Data

Feb. 27, 2015  (KR) .......................... 10-2015-0028156

(51) Int. Cl.
*H02M 3/158*  (2006.01)
*H02J 7/00*   (2006.01)
*H02J 50/12*  (2016.01)

(52) U.S. Cl.
CPC ........... *H02M 3/158* (2013.01); *H02J 7/0052* (2013.01); *H02J 50/12* (2016.02); *H02J 2007/0059* (2013.01); *Y02B 40/90* (2013.01)

(58) Field of Classification Search
CPC ....................................................... H02M 3/158
USPC ......................................................... 320/107
See application file for complete search history.

(56) References Cited

U.S. PATENT DOCUMENTS

| | | | |
|---|---|---|---|
| 5,592,069 A | 1/1997 | Dias et al. | |
| 6,646,415 B1 | 11/2003 | Nebrigic et al. | |
| 7,834,591 B2 | 11/2010 | Hussain et al. | |
| 8,274,264 B2 | 9/2012 | Prodic et al. | |
| 8,607,036 B2 | 12/2013 | More et al. | |
| 8,612,779 B2 | 12/2013 | More et al. | |
| 8,854,019 B1 | 10/2014 | Levesque et al. | |
| 2009/0033293 A1 | 2/2009 | Xing et al. | |
| 2009/0323378 A1* | 12/2009 | Melse ................... | H02M 3/07 363/60 |

(Continued)

FOREIGN PATENT DOCUMENTS

| | | |
|---|---|---|
| JP | 2000-224777 A | 8/2000 |
| JP | 4321467 B2 | 4/2006 |
| JP | 2009-213202 A | 9/2009 |

*Primary Examiner* — Edward Tso
*Assistant Examiner* — Ahmed H Omar
(74) *Attorney, Agent, or Firm* — Harness, Dickey & Pierce, P.L.C.

(57) ABSTRACT

A charger integrated circuit is provided which includes a DC-DC converter configured to receive an input voltage and generate an output voltage through a switching operation for charging a battery, and a charging controller configured to control the switching operation such that the output voltage is supplied to the battery through charging paths chargeable according to a level of the input voltage.

20 Claims, 17 Drawing Sheets

(56) References Cited

U.S. PATENT DOCUMENTS

| | | |
|---|---|---|
| 2012/0133340 A1 | 5/2012 | Masumoto et al. |
| 2012/0313572 A1 | 12/2012 | Sheu |
| 2013/0076301 A1* | 3/2013 | Bastami ............... H02J 7/0008 320/107 |
| 2014/0015507 A1* | 1/2014 | Park .......................... G05F 1/46 323/304 |
| 2014/0125127 A1 | 5/2014 | Chou et al. |
| 2014/0145504 A1 | 5/2014 | Kayama |
| 2014/0159686 A1 | 6/2014 | Lee et al. |
| 2014/0375280 A1 | 12/2014 | Jung et al. |
| 2016/0329810 A1* | 11/2016 | Lee ....................... H02M 3/158 |

\* cited by examiner

DC-DC CONVERTER, CHARGER INTEGRATED CIRCUIT AND ELECTRONIC DEVICE HAVING THE SAME AND BATTERY CHARGING METHOD THEREOF

CROSS-REFERENCE TO RELATED APPLICATIONS

This U.S. non-provisional patent application claims priority under 35 U.S.C. § 119 to Korean Patent Application No. 10-2015-0028156 filed Feb. 27, 2015, in the Korean Intellectual Property Office. The entire disclosure and contents of which are hereby incorporated by reference.

BACKGROUND

1. Field

The inventive concepts relate to a DC-DC converter, a charger integrated circuit and an electronic device including the same, and a battery charging method using the same.

2. Description of Related Art

In recent years, with the development of the electronic device, the electronic device capable of exchanging information or data is diverse. The electronic device may use a battery, which is capable of being charged with a power supply means, to provide a benefit of mobility. The battery capacity is limited, and the user may properly charge the battery before the battery's remaining amount is exhausted. In general, a charger (TA: a travel adapter) to enable charging of the battery converts a power supply of AC 110 to 220V, or a power from other power supply means (e.g., a computer), to a DC power required to charge the battery to provide the electronic device, and the electronic device uses the DC power converted by the battery charger to charge the battery.

In recent years, a method for increasing a charging current has been used to reduce time taken to charge the battery. However, in this case, power loss may occur by the circuit elements constituting the charger. In addition, in the case of using a charger of which the charging voltage is high, it is possible to reduce power loss generated in the charger, but the power loss may occur in a charging circuit of the electronic device. In other words, the high charging voltage supplied from the charger may be lost by the circuit elements of the charging circuit, which are included in the charging circuit of the electronic device.

SUMMARY

Example embodiments of the inventive concepts provide a DC-DC converter, a charge integrated circuit and the electronic device including the same, and a battery charging method thereof, capable of charging a battery in a high speed and improving charging efficiency.

An aspect of the example embodiments of the inventive concepts are directed to providing a charger integrated circuit including a DC-DC converter configured to receive an input voltage and generate an output voltage through a switching operation for charging a battery, and a charging controller configured to control the switching operation such that the output voltage is supplied to the battery through different charging paths according to a level of the input voltage.

The DC-DC converter may be a boost converter of which the output voltage is higher than the input voltage.

The DC-DC converter may be a buck converter of which the output voltage is lower than the input voltage.

The DC-DC converter may include a two-level buck converter configured to generate the output voltage by switching the input voltage and 0V, and a three-level buck converter configured to generate the output voltage by switching between the input voltage, a half of the input voltage, and 0 V.

The DC-DC converter may operate as the two-level buck converter when a value of the input voltage is less than a predetermined value.

The DC-DC converter may operate as the three-level buck converter when a value of the input voltage is greater than or equal to a predetermined value.

The two-level buck converter and the three-level buck converter may be independent of each other.

The two-level buck converter and the three-level buck converter may be a shared component with each other.

The two-level buck converter may control a duty through switching between the input voltage and 0 V.

The three-level buck converter may control a duty and a level by switching between half of the input voltage and 0V or by switching between a half of the input voltage and the input voltage.

Another aspect of the example embodiments of the inventive concepts is directed to providing a DC-DC converter, which includes a hybrid-level switch circuit configured to receive the input voltage and perform a switching operation in response to a control signal, to generate the output voltage, and a low pass filter configured to smooth the output voltage. Different switching operations are performed according to a level of the input voltage.

A first switching operation in which the DC-DC converter may operate as a two-level converter is performed, when a value of the input voltage is less than a predetermined value. A second switching operation in which the DC-DC converter operates as a three-level converter is performed when a value of the input voltage is greater than or equal to the equal to a predetermined value. A first charging path formed according to the first switching operation is different from a second charging path formed according to the second switching operation.

The DC-DC converter may include a hybrid-level switch circuit configured to receive the input voltage and perform a two-level or three-level switching operation in response to first to fourth control signals, an inductor configured to receive an output node voltage of the hybrid-level switch circuit and a capacitor connected between the inductor and a ground terminal. The hybrid-level switch circuit may include a first transistor connecting an input terminal and a first node, connected to receive the input voltage, in response to the first control signal, a second transistor connecting the first node and the output node in response to the second control signal, a third transistor connecting the output node and the second node in response to the third control signal, a fourth transistor connecting the second node and the ground terminal in response to the fourth control signal, a comparison capacitor connected between the first node and the second node, and a comparator configured to amplify a voltage between the first node and the second node to output a comparison voltage.

The charging controller may include a control factor selector configured to receive at least one of the input voltage, an input current, a temperature and a battery voltage, an amplifier configured to output an error voltage by comparing a factor voltage with a reference voltage and a control signal generator configured to generate the first to the fourth control signals corresponding to a level of the input voltage in response to the error voltage.

The hybrid-level switch circuit may include a PMOS transistor connecting the input terminal and the first node in response to an auxiliary PMOS control signal and an NMOS transistor connecting the second node and the ground terminal in response to an auxiliary NMOS control signal.

The first to fourth control signals may be transmitted to gates of the first to fourth transistors using corresponding to level shifters and gate drivers, respectively.

The charging controller may further include a level selector. The level selector may include a first comparator configured to generate a conversion mode enable signal by comparing the input voltage with a reference voltage and a second comparator configured to generate a three-level enable signal by comparing the input voltage with the comparison voltage in response to the conversion mode activation signal.

The charging controller may generate the first control signal and the second control signal such that the first to fourth transistors perform switching operations when the comparison voltage is greater than or equal to a predetermined voltage.

The charging controller may generate the first control signal and the second control signal such that, when the comparison voltage is less than the predetermined voltage, the first and fourth transistors are turned on and the second and third transistors are turned off.

Switching frequencies corresponding to the charging paths may be different from each other.

Another example embodiment of the inventive concepts is directed to providing an electronic device including a battery and a charger integrated circuit configured to receiving an input voltage, and generating an output voltage for charging the battery. The charger integrated circuit includes a DC-DC converter operating as one of 2-level and 3-level buck converters in response to a level of the input voltage.

The DC-DC converter may include a hybrid-level switch circuit configured to receive the input voltage and perform a two-level or three-level switching operation in response to first to fourth control signals, an inductor configured to receive an output node voltage of the hybrid-level switch circuit, and a capacitor connected between the inductor and a ground terminal. The hybrid-level switch circuit may include a first transistor connecting an input terminal and a first node, connected to receive the input voltage, in response to the first control signal; a second transistor connecting the first node and the output node in response to the second control signal; a third transistor connecting the output node and the second node in response to the third control signal; a fourth transistor connecting the second node and the ground terminal in response to the fourth control signal; a comparison capacitor connected between the first node and the second node, and a comparator configured to amplify a voltage between the first node and the second node to output a comparison voltage.

A switching frequency for an operation of the three-level buck converter is slower than that of the two-level buck converter.

The electronic device may further include a power management chip configured to receive a battery voltage from the battery to generate and manage power supply voltages required for driving.

The electronic device may further include an application processor, a first power management chip configured to receive a battery voltage from the battery to manage at least one first power required for driving the application processor, a modem chip configured to perform wired and/or wireless communication, and a second power management chip configured to receive the battery voltage from the battery to manage at least one second power required for driving the modem chip.

The electronic device may further include an application processor and a buck-boost circuit configured to receive the battery voltage from the battery to generate a voltage to be supplied to the application processor.

The electronic device may further include a wireless power charger configured to receive a wireless power signal to generate the input voltage.

In another example embodiment of the inventive concepts is directed to providing a DC-DC converter, including a hybrid-level switch circuit configured to generating a first output voltage corresponding to a two-level buck converter operation by performing a first switching operation in response to first control signal; or a second output voltage corresponding to a three-level buck converter operation by performing a second switching operation in response to second control signals, and a low-pass filter configured to smooth the first output voltage or the second output voltage.

In another example embodiment of the inventive concepts is directed to providing a battery charging method of a charge integrated circuit including detecting a level of an input voltage, selecting a buck converter corresponding to a level of the input voltage, and charging a battery using the selected buck converter.

Selecting the buck converter may include selecting a three-level buck converter when a level of the input voltage is greater than or equal to a predetermined level, and selecting a two-level buck converter when a level of the input voltage is less than the predetermined level.

According to example embodiment in accordance with the inventive concepts as described above, the DC-DC converter, charger integrated circuit, and electronic devices having the same and battery charging method thereof, by charging the battery used each other different path according to the charging level of the input voltage, thereby charging at a high speed, maximizing the charging efficiency.

BRIEF DESCRIPTION OF THE FIGURES

The foregoing and other features of the inventive concepts will be apparent from the more particular description of the non-limiting example embodiments of the inventive concepts, as illustrated in the accompanying drawings in which like reference characters refer to like parts throughout the different views. The drawings are not necessarily to scale, emphasis instead being placed upon illustrating principles of the inventive concepts. In the drawings.

DETAILED DESCRIPTION

Figure 1:
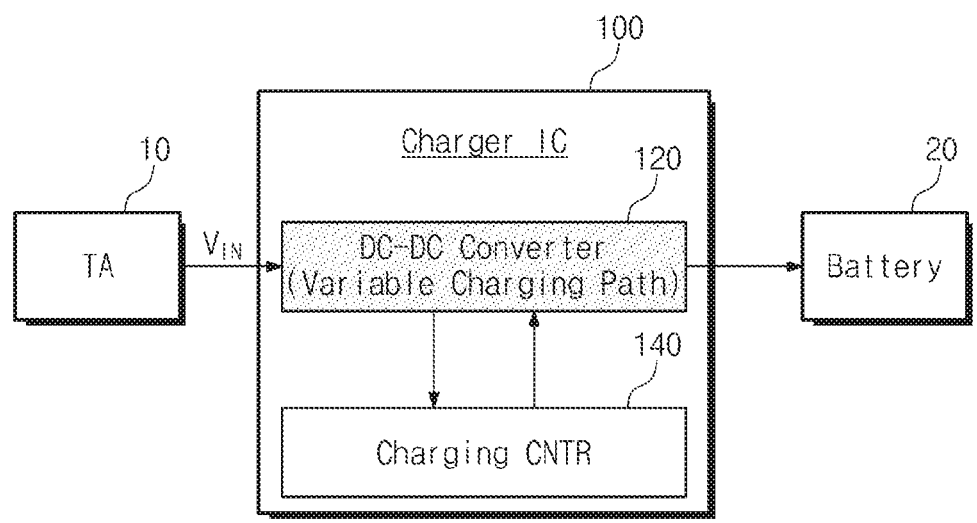
FIG. 1 is a diagram illustrating a charger integrated circuit for explaining an example embodiment of the inventive concepts.

Detailed example embodiments of the inventive concepts are disclosed herein. However, specific structural and functional details disclosed herein are merely representative for purposes of describing the example embodiments of the inventive concepts. The example embodiments of the inventive concepts may, however, be embodied in many alternate forms and should not be construed as limited to only the embodiments set forth herein. Rather, these example embodiments, in accordance with the inventive concepts, are provided so that this disclosure will be thorough and complete, and will fully convey the scope of the inventive concepts to one of ordinary skill in the art. As the inventive concepts allow for various changes and numerous embodiments, particular embodiments will be illustrated in the drawings and described in detail in the written description. However, this is not intended to limit the inventive concepts to particular modes of practice, and it is to be appreciated that all changes, equivalents, and substitutes that do not depart from the spirit and technical scope of the inventive concepts are encompassed in the inventive concepts. Like reference numerals refer to like elements throughout. Sizes of structures may be greater or less than real structures for clarity of the inventive concepts.

It will be understood that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof. It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a diagram illustrating a charger integrated circuit 100, in accordance with an example embodiment of the inventive concepts. Referring to FIG. 1, a charger 10 (e.g., a travel adapter (TA)) may convert a power supply (e.g., AC 110~220V) or a power from other power supply device (e.g., a computer) to a DC power required to charge a battery.

According to an example embodiment of the inventive concepts, a charger integrated circuit 100 may include a DC-DC converter 120, and a charging controller 140.

The DC-DC converter 120 may receive an input voltage VIN and may generate the output voltage through a switching operation for charging the battery 20. In particular, the DC-DC converter 120 may be provided with a plurality of charging paths and may change a charging path through the switching operation. The charging controller 140 may control the switching operation so as to output an output voltage to the battery 20 through a path varying with a level of the input voltage VIN.

When a value of the input voltage VIN is less than a predetermined value, the charging controller 140 may control the DC-DC converter 120 to charge the battery 20 through a first charging path. Furthermore, when a value of the input voltage VIN is greater than or equal to the predetermined value, the charging controller 140 may control the DC-DC converter 120 to charge the battery 20 through a second charging path. Here, the second charging path may be different from the first charging path.

The charger integrated circuit 100 may include a under voltage lockout (UVLO) function, an over-current protection (OCP) function, an over-voltage protection (OVP) function, an internal soft-start function for reducing the inrush current, a fold-back current limit function, a hiccup-mode function for protecting a short-circuit, and an over-heating blocking (over temperature protection: OTP) function to operate properly even under a power-saving condition. In an example embodiment of the inventive concepts, the charger integrated circuit 100 may include an open-drain power good (PG) pin.

When a connection of an On-The-Go (OTG) device is detected, the charger integrated circuit 100 may include a path for charging the battery 20 and other charging path.

A general charger integrated circuit may charge the battery through the same charge path regardless of a level of the input voltage VIN. At this time, when higher than a specific voltage, the input voltage VIN may be charged by the maximum charging efficiency, but when lower than the specific voltage, the charging efficiency may be markedly reduced. However, the charger integrated circuit 100 of the inventive concepts may optimize the charging efficiency regardless of the input voltage VIN by selecting a charging path for optimizing charging efficiency based on a level of the input voltage VIN and charging the battery 20 through the selected charging path.

The DC-DC converter 120 illustrated in FIG. 1 may be at least one buck converter for generating a target output voltage lower than the input voltage VIN, or at least one boost converter for generating the target output voltage higher than the input voltage VIN. As discussed below, it is assumed that the DC-DC converter 120 is implemented with a buck converter, for the convenience of description.

Figure 2:
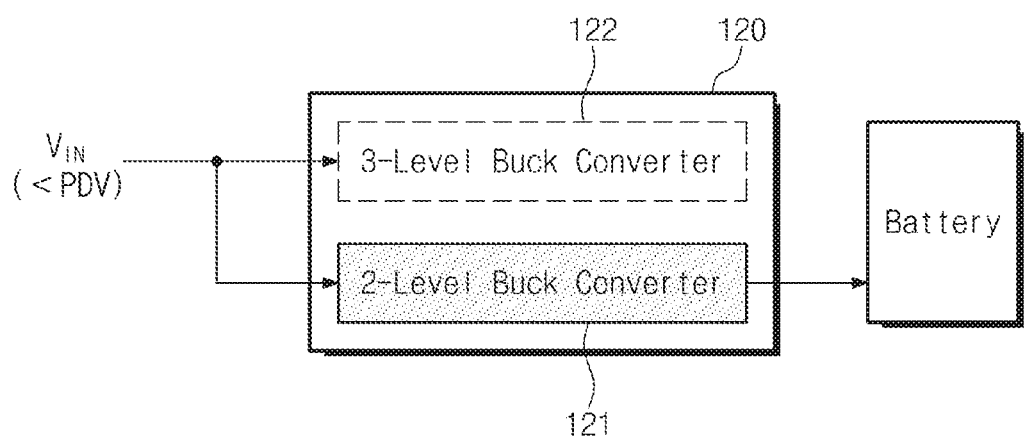
FIG. 2 is a block diagram illustrating a first charging path for a DC-DC converter shown in FIG. 1.

FIG. 2 is a diagram illustrating a first charging path about a DC-DC converter 120 shown in FIG. 1. For the convenience of explanation, it is assumed that a DC-DC converter 120 includes a two-level buck converter 121, and a three-level buck converter 122. In an example embodiment of the inventive concepts, the two-level buck converter 121 and the three-level buck converter 122 may be configured to be independent of each other. In another example embodiment of the inventive concepts, the two-level buck converter 121 and the three-level buck converter 122 may be configured to have a shared component. Here, the terms "two-level" and "three-level" relate to the number of voltage levels used for a switching operation of the DC-DC converter 120. In FIG. 2, two buck converters 121 and 122 having different levels may be illustrated for the convenience of description. However, the number of voltage levels of the buck converter used for a switching operation of the inventive concept may not be limited to this disclosure.

Referring to FIG. 2, when a value of the input voltage VIN is less than a predetermined value PDV, the DC-DC converter 120 may charge a battery 20 through a first charging path in which the two-level buck converter 121 is used. Here, the two-level buck converter 121 may generate a target output voltage by switching a first voltage (e.g., VIN) and a second voltage (e.g., 0V).

Figure 3:
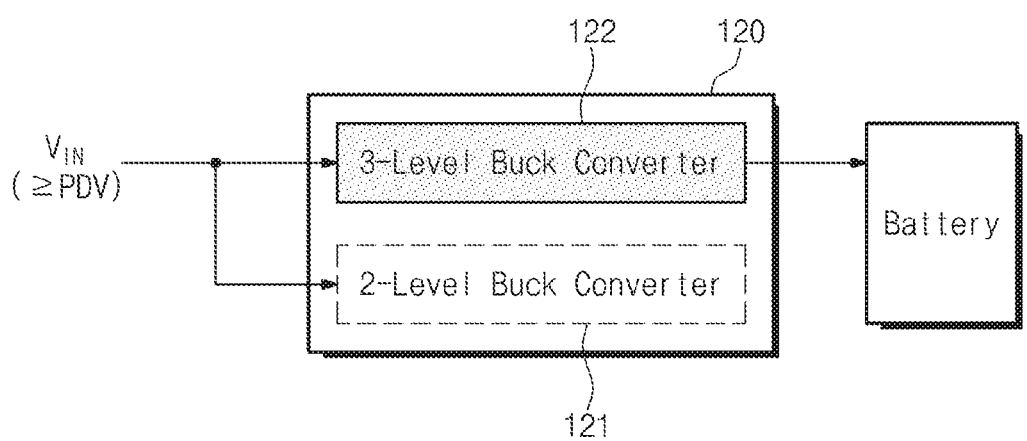
FIG. 3 is a block diagram illustrating a second charging path for the DC-DC converter shown in FIG. 1.

FIG. 3 is a diagram for explaining a second charging path for the DC-DC converter 120 illustrated in FIG. 1. Referring to FIG. 3, when a value of the input voltage VIN is greater than or equal to a predetermined value PDV, the DC-DC converters 120 may charge a battery 20 through a second charging path in which a three-level buck converter 122 is used. Here, the three-level buck converter 122 may generate a target output voltage by switching a first voltage (e.g., VIN) and a second voltage (0.5 VIN), or by switching the second voltage (0.5 VIN) and a third voltage (0V).

As illustrated in FIGS. 2 and 3, the DC-DC converter 120 may be implemented with the two-level buck converter 121 and the three-level buck converter 122 configured to be independent of each other. However, the scope and spirit of the inventive concepts may not be limited thereto. The DC-DC converter 120 of the inventive concepts may be implemented with the two-level and three-level buck converters configured to be shared wholly or partially.

Figure 4:
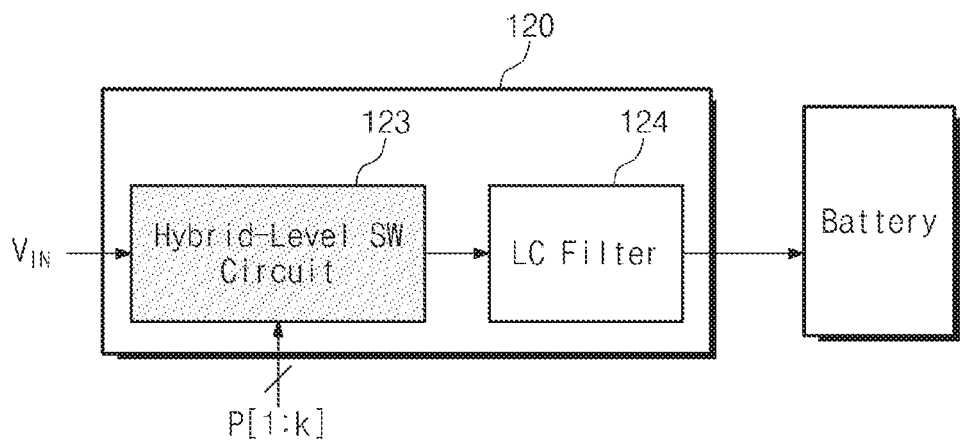
FIG. 4 is a block diagram illustrating a DC-DC converter according to an example embodiment of the inventive concepts.

FIG. 4 is a diagram illustrating a DC-DC converter 120 in accordance with an embodiment of the inventive concept. Referring to FIG. 4, a DC-DC converter 120 may include a hybrid-level switch circuit 123 and a low-pass filter 124.

The hybrid-level switch circuit 123 may operate as one of 2-level and 3-level buck converters by receiving an input voltage VIN and performing a switching operation in response to control signals P[1:k] (k being an integer of 2 or more). For example, the hybrid-level switch circuit 123 may generate an output voltage, which chops (or, alternates) between two levels or between three levels, in response to the control signals P[1:k].

In the example embodiment of the inventive concepts, the hybrid-level switch circuit 123 may include a first charging path to operate as a 2-level buck converter through a first switching operation performed in response to a first control signal P[1:k]; and a second charging path to operate as a 3-level buck converter through a second switching operation performed in response to a second control signal P[1:k].

A low-pass filter 124 may smooth the output voltage chopping (or alternating) in the hybrid-level switch circuit 123. The low-pass filter 124 may include an inductor and a capacitor. A voltage smoothed by the low-pass filter 124 may be charged to a battery 20 (referring to FIG. 1).

Figure 5:
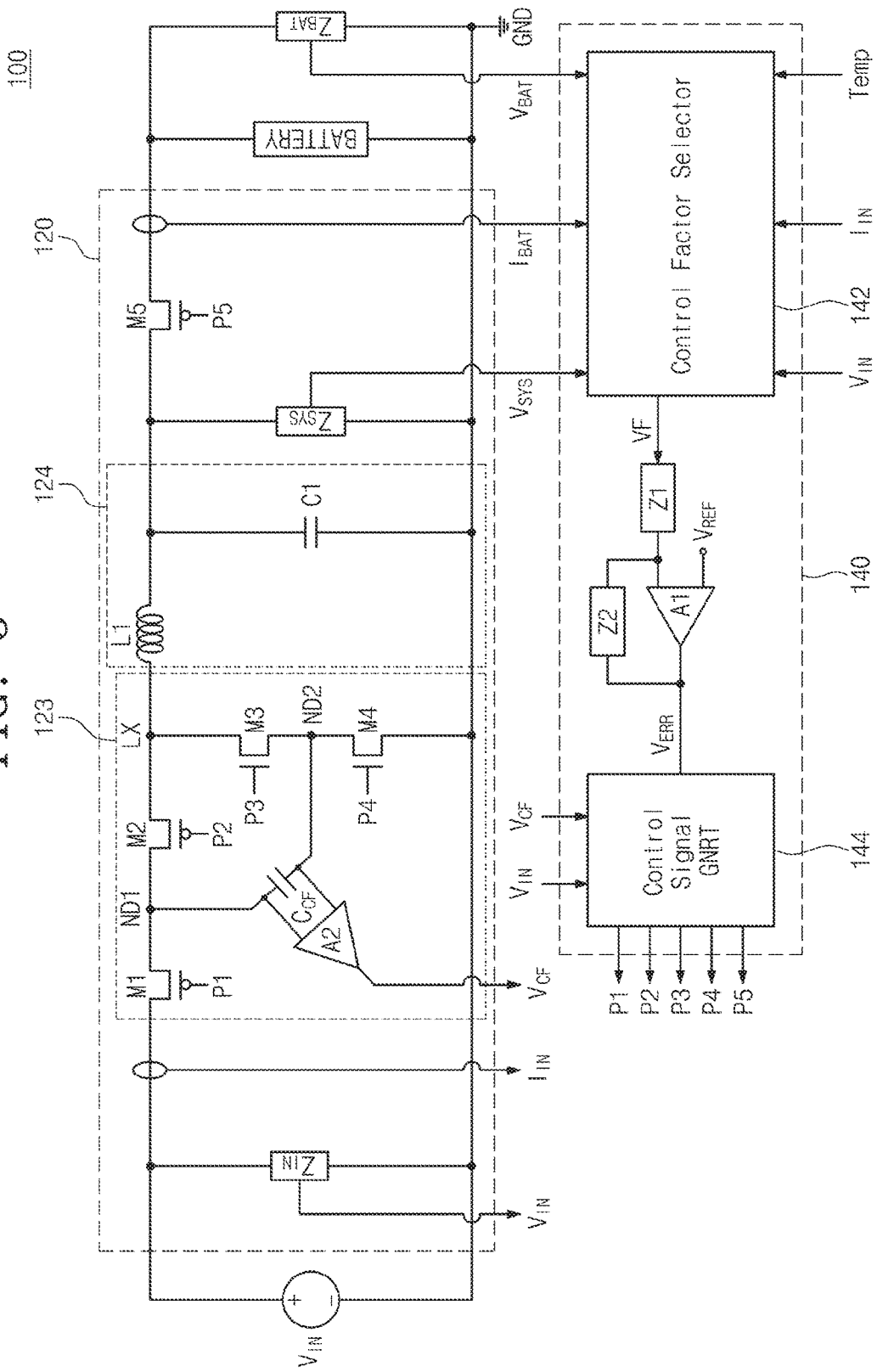
FIG. 5 is a block diagram illustrating a charger integrated circuit according to an example embodiment of the inventive concepts.

FIG. 5 is a diagram illustrating a charger integrated circuit 100 in accordance with an example embodiment of the inventive concepts. Referring to FIG. 5, a charger integrated circuit 100 may include a DC-DC converter 120 and a charging controller 140.

The DC-DC converter 120 may operate as a two-level buck converter 121 (referring to FIG. 2), or a three-level buck converter 122 (referring to FIG. 3) in response to control signals P1 to P4. The DC-DC converter 120 may include a hybrid-level switch circuit 123 and a low pass filter 124.

The hybrid-level switch circuit 123 may receive an input voltage VIN and may perform a two-level/three-level switching operation in response to the first to fourth control signals P1 to P4. The hybrid-level switch circuit 123 may include first to fourth transistors M1 to M4, a comparison capacitor CCF, and an amplifier A2.

The first transistor M1 may connect an input terminal and a first node ND1 in response to the first control signal P1. The second transistor M2 may connect the first node ND1 and an output node LX in response to the second control signal P1. The third transistor M3 may connect the output node LX and a second node ND2 in response to the third control signal P3. The fourth transistor M4 may connect the second node ND2 and a ground terminal GND in response to the fourth control signal P4. Here, the input terminal may receive the input voltage VIN from a power source TA (referring to FIG. 1). The comparison capacitor CCF may be connected between the first node ND1 and the second node ND2. The amplifier A2 may output a comparison voltage VCF by amplifying a voltage difference between the first node ND1 and the second node ND2. The inductor L1 may receive a voltage from the node LX of the switch circuit 123. The capacitor C1 may be connected between a charging node and the ground terminal GND. Here, the charging node may be a node between the inductor L1 and the capacitor C1.

The low-pass filter 124 may smooth a voltage of the output node LX. The low-pass filter 124 may include the inductor L1 and the capacitor C1. The inductor L1 may be coupled between the output node LX and a charging node. The capacitor C1 may be connected between the charging node and the ground terminal GND.

A fifth transistor M5 may transmit a system voltage VSYS of the charging node to one end of the battery 20 in response to the fifth control signal P5. Here, the system voltage VSYS may be a target output voltage of the DC-DC converter 120. On the other hand, returning to FIG. 5, the diodes ZIN, ZSYS, and ZBAT may be provided between the input terminal and the ground terminal GND, between the output terminal and the ground terminal GND, and between the one end of the battery and the ground terminal, respectively.

A charging controller 140 may receive an input voltage VIN, an input current IIN, temperature information Temp, a comparison voltage VCF, a system voltage VSYS, a battery voltage VBAT, and a battery current IBAT and may control the DC-DC converter 120 by generating corresponding control signals P1 to P5. The charging controller 140 may include a control factor selector 142, a control signal generator 144, an amplifier A1, and resistors Z1 and Z2.

The control factor selector 142 may receive at least one of the input voltage VIN, the input current IIN, the temperature information Temp, the system voltage VSYS, the battery voltage VBAT, and the battery current IBAT and may generate a corresponding factor voltage VF. The amplifier A1 may generate an error voltage VERR by comparing a voltage output from resistance Z1 to which the selected factor voltage VF is applied, with a reference voltage Vref. Here, the input and output terminals of the amplifier A1 may be connected by the resistor Z2. The error voltage VERR may be used to determine whether to activate the control signal generator 144. For example, the control signal generator 144 may be activated when a level of the error voltage VERR corresponds to a supply voltage level, and may be disabled when the level of the error voltage VERR corresponds to a ground voltage level.

The control signal generator 144 may receive the error voltage VERR, the input voltage VIN, and the comparison voltage VCF and may generate corresponding control signals P1 to P5. For example, when the input voltage VIN is greater than or equal to the comparison voltage VCF, the control signal generator 144 may generate the control signals P1 to P4 in response to the error voltage VERR such that the DC-DC converter 120 operate as a three-level buck converter. In the example embodiment of the inventive concepts, the comparison voltage VCF may be determined according to an operating range of the transistors M1 to M4. For example, the comparison voltage VCF may be approximately 3.6 V. On the other hand, when the input voltage VIN is lower than the comparison voltage VCF, the control signal generator 144 may generate the control signals P1 to P4 such that the DC-DC converter 120 operates as the 2-level buck converter in response to the error voltage VERR.

Figure 6:
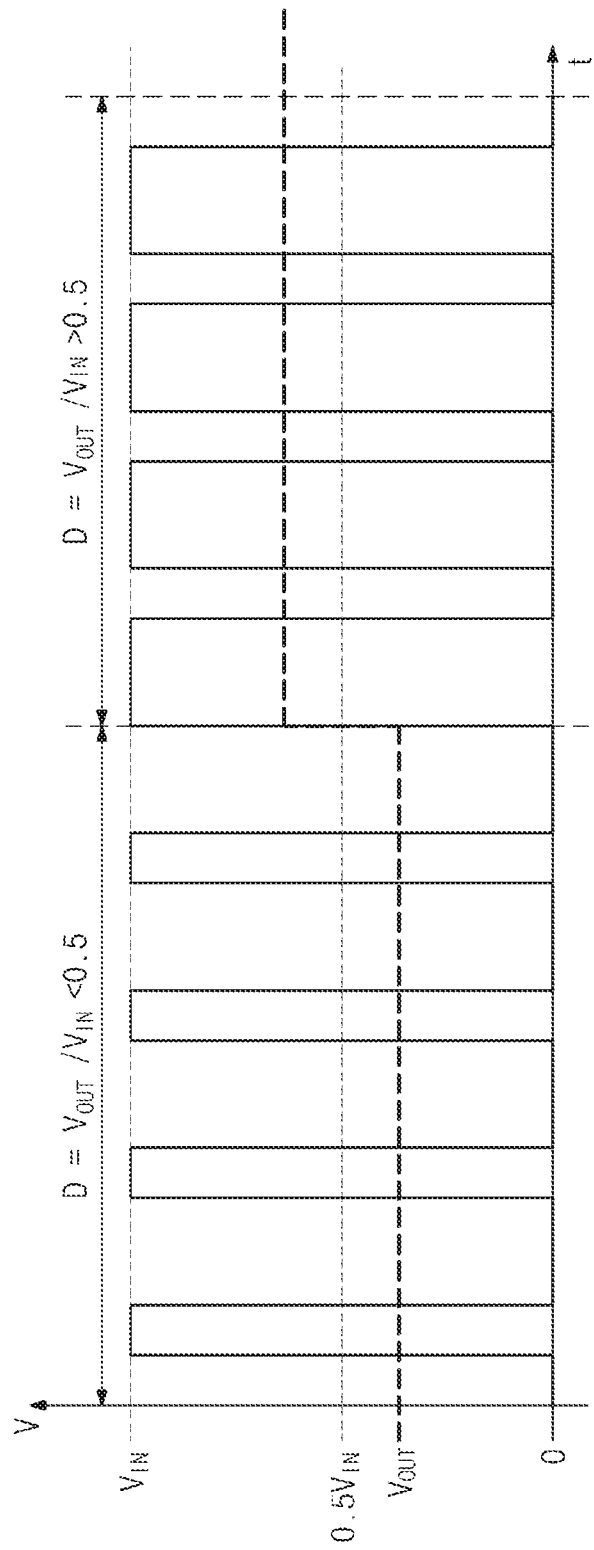
FIG. 6 is a diagram illustrating an exemplary waveform of the node (LX) according to a duty cycle when the DC-DC converter is operating as a 2-level buck converter shown in FIG. 5.

FIG. 6 is a timing chart illustrating a waveform of an output node LX based on a duty D (=VOUT/VIN) when the DC-DC converter 120 shown in FIG. 5 operates as a two-level buck converter. Referring to FIG. 6, an output node LX is switched between an input voltage VIN and 0 V. To obtain a target output voltage VOUT, the duty D may be controlled by a charging controller 140.

Figure 7:
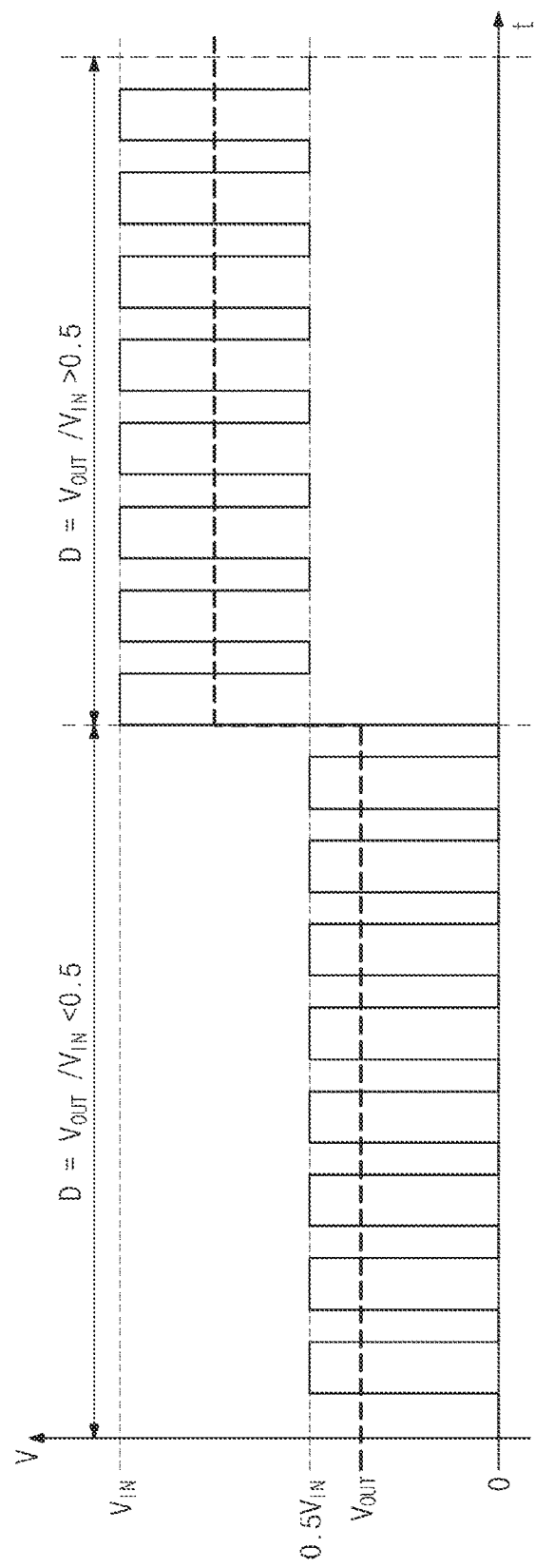
FIG. 7 is a diagram illustrating the exemplary waveform of the node (LX) according to a duty cycle when a DC-DC converter is operating as a 3-level buck converter shown in FIG. 5.

FIG. 7 is a timing chart illustrating a waveform of an output node LX based on a duty D when a DC-DC converter 120, shown in FIG. 5, operates as a three-level buck converter. Referring to FIG. 7, the node LX is switched between the input voltage VIN, half of the input voltage 0.5 VIN, and 0 V. To obtain a target output voltage VOUT, the duty D and the output voltage level may be controlled by the charging controller 140.

The charging efficiency loss Ploss of the DC-DC converter 120 may be classified into two types.

$$P_{loss} = I^2 R_{ON} + CV_{DD}^2 f/2 \qquad \text{[Equation 1]}$$

Here, "I" may be a current, "$R_{ON}$" may be on-resistance value between a charger TA (referring to FIG. 1) and a charger integrated circuit 100, "C" may be capacitance, "VDD" may be a voltage at the node LX, and "f" may be a switching frequency of the input voltage VIN. The charging efficiency loss Ploss of the DC-DC converter 120 may be classified into conduction loss caused by the on-resistance RON of the DC-DC converter 120 and switching loss caused by the node conversion of the DC-DC converter 120.

Referring to equation 1, the on-resistance RON may be reduced as much as possible so as to reduce the conduction loss. The switching frequency "F" or the capacitance "C" may be reduced to reduce the switching losses, or the voltage VDD applied to the node LX may become lower. At this time, the most effective way for reducing the switching losses may reduce a voltage VDD across the DC-DC converter 120. The reason may be that the frequency "F" or the capacitance "C" is reduced four times due to the proportion to the square of the voltage VDD.

Thus, when the input voltage VIN is higher than the voltage VDD, switching losses in the equation 1 may be dominant. When the input voltage VIN is lower than the voltage VDD, conduction losses may be dominant. That is, when the input voltage VIN is lower than the voltage VDD, the dominance of the conduction losses may be greater because the on-resistance RON is inversely proportional to a gate-source voltage.

According to an example embodiment of the inventive concepts, when the input voltage VIN is higher than the voltage VDD, the charger integrated circuit 100 may control switching operations of four transistors M1 to M4 such that the DC-DC converter 120 operates as the three-level buck converter. In this way, the switching losses may be reduced because the voltage VDD between the source and the drain is half (0.5 VIN) of the input voltage VIN. In addition, the DC-DC converter 120 may reduce the capacitance by using CMOS transistors M1 to M4 for a switching operation.

In addition, according to an example embodiment of the inventive concepts, when the input voltage VIN is lower than the voltage VDD, the charger integrated circuit 100 may control switching operations of four transistors M1 to M4 such that the DC-DC converter 120 operates as the two-level buck converter. For example, to reduce conduction losses caused by the on-resistance RON, the DC-DC converter 120 may be used as the two-level buck converter by turning on the transistors M1 and M4.

The DC-DC converter 120 may be used as, but not limited to, a buck converter. The DC-DC converter 120 of the inventive concepts may also be used as a boost converter. Upon boosting a voltage toward an input terminal through the battery 20 for the on-the-go (OTG) mode, the DC-DC converter 120 may be used as a two-level boost converter through a switching operation.

In summary, according to an example embodiment of the inventive concepts, when the input voltage VIN is relatively lower than the voltage VDD, the DC-DC converter 120 may operate as the two-level buck converter. When the input voltage VIN is relatively higher than the voltage VDD, the DC-DC converter 120 may operate as the three-level buck converter. Therefore, it is possible to maximize the charging efficiency of the charge integrated circuit 100.

In addition, according to an example embodiment of the inventive concepts, when the battery voltage is input for supporting the OTG mode, the DC-DC converter 120 may operate as not a 3-level converter but a 2-level converter, thereby improving the charging efficiency.

Figure 8:
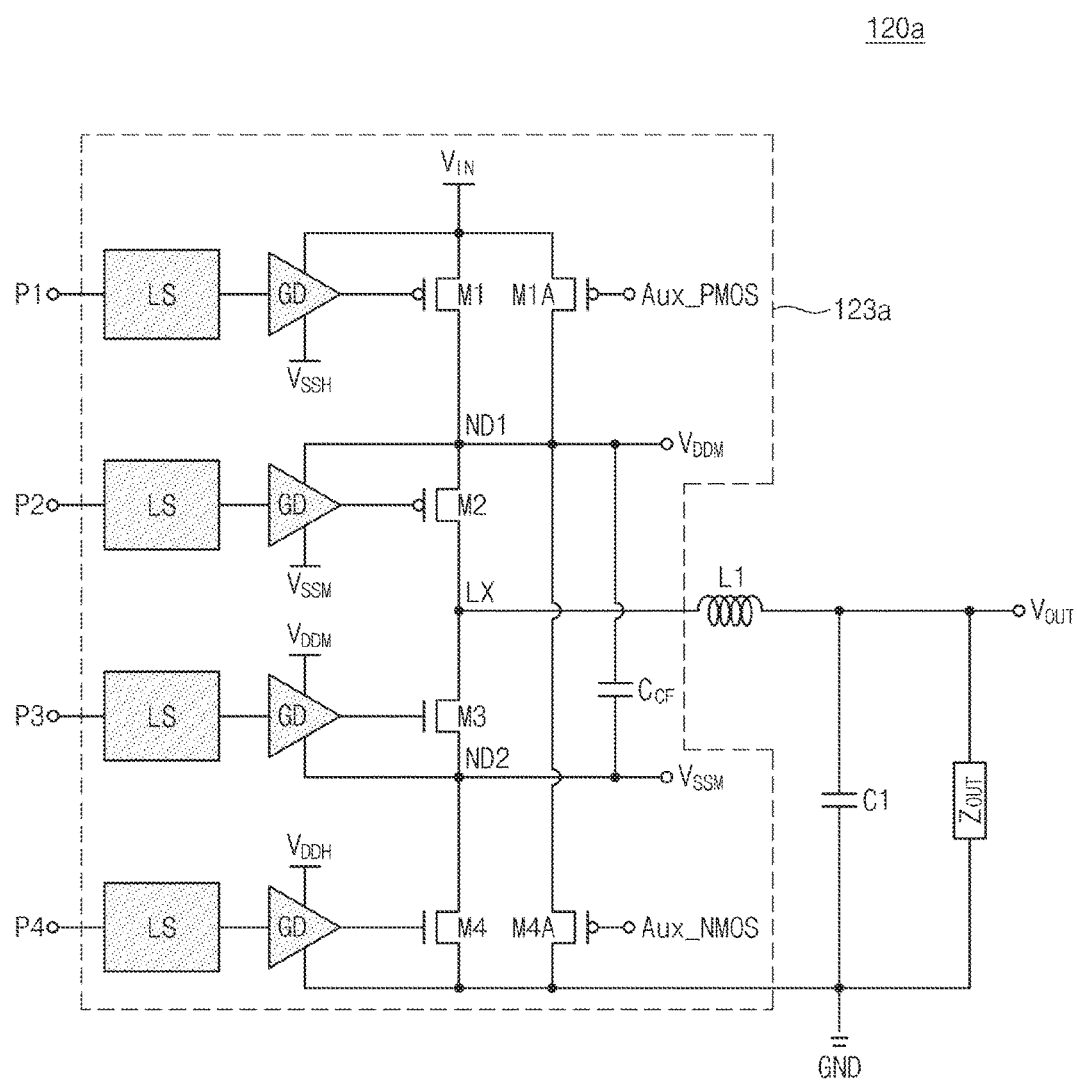
FIG. 8 is a block diagram illustrating a DC-DC converter according to another example embodiment of the inventive concepts.

FIG. 8 is a diagram illustrating a DC-DC converter 120a according to an example embodiment of the inventive concepts. Referring to FIG. 8, in comparison with a DC-DC converter shown in FIG. 5, a DC-DC converter 120a may further include level shifters LS respectively receiving control signals P1 to P4, gate drivers GD, and transistors M1A and M4A for performing an auxiliary function.

A transistor M1A connected in parallel to a first transistor M1 may be turned on/off through an auxiliary PMOS control signal Aux_PMOS. Here, the transistor M1A may be implemented with a PMOS transistor. The transistor M4A connected in parallel to a fourth transistor M4 may be turned on/off through an auxiliary NMOS control signal Aux_NMOS. Here, the transistor M4A may be implemented with an NMOS transistor.

In the example embodiment of the inventive concepts, the first to fourth control signals P1 to P4 may be transferred to the first to fourth transistors M1 to M4 through corresponding level shifters LS and gate drivers GD, respectively.

Figure 9:
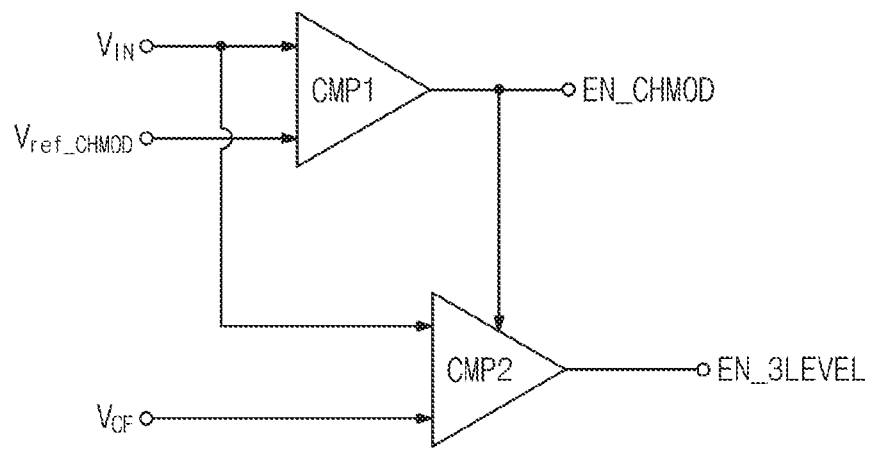
FIG. 9 is a diagram illustrating a level selector of the charging controller in accordance with an example embodiment of the inventive concepts.

FIG. 9 is a diagram illustrating a level selector 143 of a charging controller 140 in accordance with an example embodiment of the inventive concepts. Referring to FIG. 9, a level selector 143 may include comparators CMP1 and CMP2. A first comparator CMP1 may receive an input voltage VIN and a conversion mode reference voltage Vref_CHMOD and may generate a conversion mode activation signal EN_CHMOD. A second comparator CMP2 may receive the input voltage VIN and a comparison voltage VCF and may generate a 3-level enable signal EN_3LEVEL. At this time, the second comparator CMP2 may be activated by the conversion mode activation signal EN_CHMOD. In response to the conversion mode activation signal EN_CHMOD, a control signal generator 144 shown in FIG. 5 may generate control signals P1 to P4 for an operation of a three-level buck converter.

Figure 10:
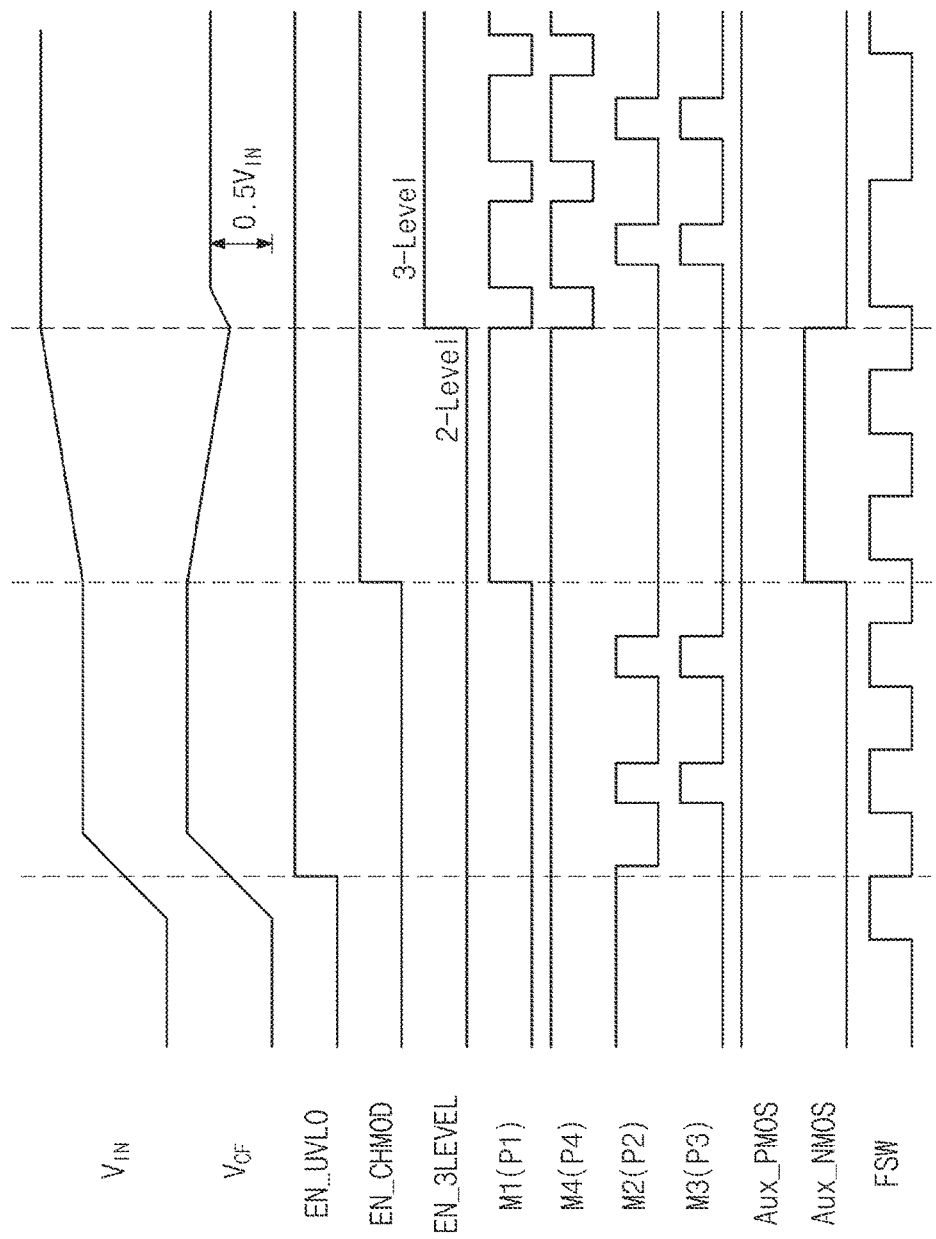
FIG. 10 is a timing diagram illustrating the input and output waveforms of the DC-DC converter when the input voltage is increasing.

FIG. 10 is a timing chart illustrating an input waveform and an output waveform of a DC-DC converter 120a when an input voltage VIN increases. Referring to FIG. 10, when the input voltage VIN increases, a DC-DC converter 120a may operate as a two-level buck converter during a period where the input voltage VIN does not exceed a rated voltage of a power switch. As illustrated in to FIG. 10, pulse signals P1 to P4 may be generated so as to have a desired output voltage while transistors M1 and M4 are turned on and transistors M2 and M4 are switched.

When the input voltage VIN is increased a little more and is greater than or equal to the rated voltage of the power switch, the DC-DC converter 120a may operate as a three-level buck converter so as to protect a device. At this time, level conversion may be made through a level selector 143 illustrated in FIG. 9.

When the input voltage VIN and the comparison voltage VCF increases at the same time, an under-voltage lockout enable signal EN_UVLO may have a high level at a specific point. The DC-DC converter 120a may provide a current/voltage for charging a battery 20 (referring to FIG. 1) in response to the under-voltage lockout enable signal EN_UVLO. When the input voltage VIN is greater than or equal to the rated voltage, as shown in FIG. 9, a conversion mode activation signal EN_CHMOD may go to a high level. At this time, a transistor M1 may be turned off based on a high pulse P1, and the comparison voltage VCF may be forcibly down because an auxiliary transistor M4A is turned on by an auxiliary NMOS control signal Aux_NMOS. When the comparison voltage VCF is lower than a voltage of "0.5 VIN", a three-level enable signal EN_3LEVEL may go to a high level.

The DC-DC converter 120a may operate normally as the three-level buck converter through a switching operation of the transistors M1 to M4. In this case, in the example embodiment of the inventive concepts, the same switching frequency FSW may be used at a two-level and a three-level. In another example embodiment of the inventive concepts, as shown in FIG. 10, a three-level switching frequency FSW may be lower than a two-level switching frequency FSW, because a ripple of an inductor current L1 is reduced.

Figure 11:
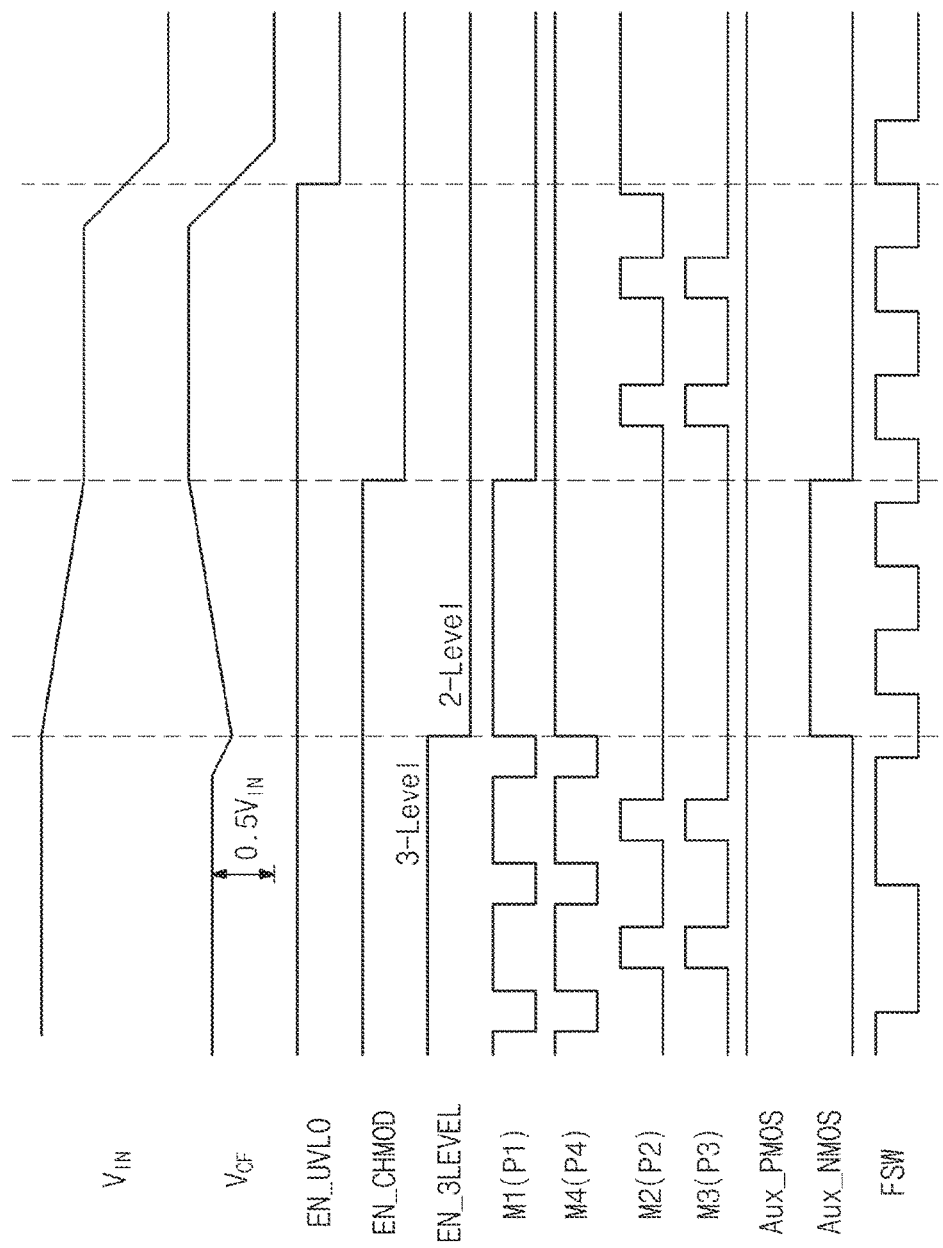
FIG. 11 is a timing diagram illustrating the input and output waveforms of the DC-DC converter when the input voltage is decreasing.

FIG. 11 is a timing diagram illustrating an input and output waveforms of a DC-DC converter when an input voltage VIN is decreasing. Referring to FIG. 11, in contrast to that shown in FIG. 10, upon converting from a three-level converter to a two-level buck converter, a transistor M1A may be conducted by an auxiliary PMOS control signal Aux_PMOS, and a capacitor CCF may be charged during a time period to increase a comparison voltage VCF. Afterward, a DC-DC converter 120a may operate as a two-level buck converter by turning on a first transistor M1 in response to a control signal P1.

On the other hand, when the input voltage VIN and the comparison voltage VCF are decreasing at the same time and are lower than or equal to a specific point, the under-voltage lockout enable signal EN_UVLO may be at a low level. The DC-DC converter 120a may block supplying of a current/voltage for charging the battery 20 (referring to FIG. 1) in response to the under-voltage lockout enable signal EN_UVLO.

Figure 12:
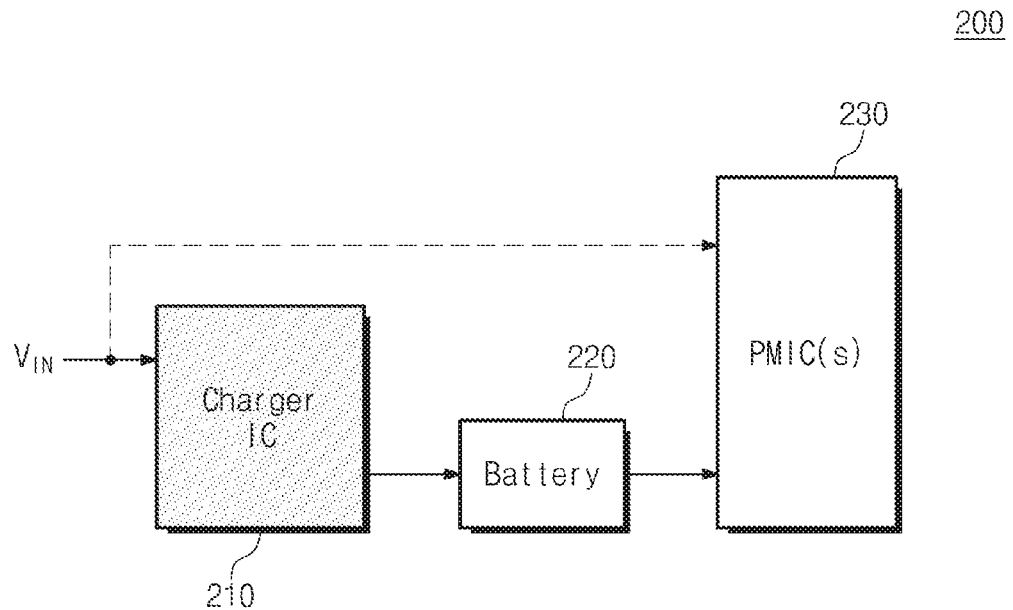
FIG. 12 is a block diagram illustrating the first embodiment of the electronic device having a charger integrated circuit according to an example embodiment of the inventive concepts.

FIG. 12 is a diagram illustrating an example embodiment of an electronic device having a charger integrated circuit according to an embodiment of the inventive concepts. Referring to FIG. 12, an electronic device 200 may include a charger integrated circuit 210, a battery 220, and a power management IC (PMIC) 230. The charger integrated circuit 210 may be implemented with the charger integrated circuit 100 illustrated in FIG. 1. The power management IC 230 may be implemented to generate and manage voltages required for an internal structure (not shown) of the electronic device 100. The power management IC 230 may receive a battery voltage from the battery 220 or may be directly supplied with an input voltage VIN.

On the other hand, the electronic device 200 of FIG. 12 may include a power management chip 230. However, the scope and spirit of the inventive concepts may not be limited thereto. An electronic device of the inventive concepts may include a plurality of power management chips.

Figure 13:
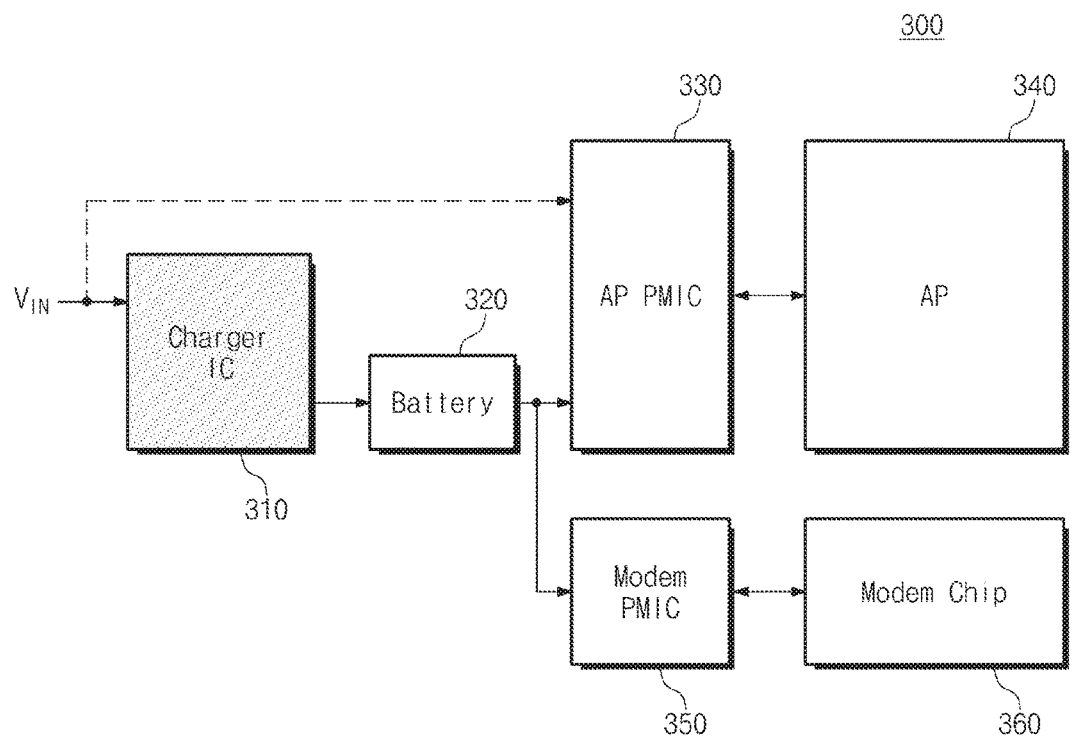
FIG. 13 is a block diagram illustrating another example embodiment of the electronic device having a charger integrated circuit according to an example embodiment of the inventive concepts.

FIG. 13 is a diagram illustrating another example embodiment for an electronic device having a charger integrated circuit according to an example embodiment of the inventive concepts. Referring to FIG. 13, the electronic device 300 may include a charger integrated circuit 310, a battery 320, an application processor PMIC 330, an application processor (AP) 340, a modem PMIC 350, and a modem chip 360. The electronic device 300 may be illustrated as separately including the AP power management chip 330 for the application processor AP 340 and the modem power management chip 350 for the modem chip 360.

On the other hand, the electronic device of the inventive concepts may be implemented such that the AP 340 and the modem 360 are included in one chip.

Figure 14:
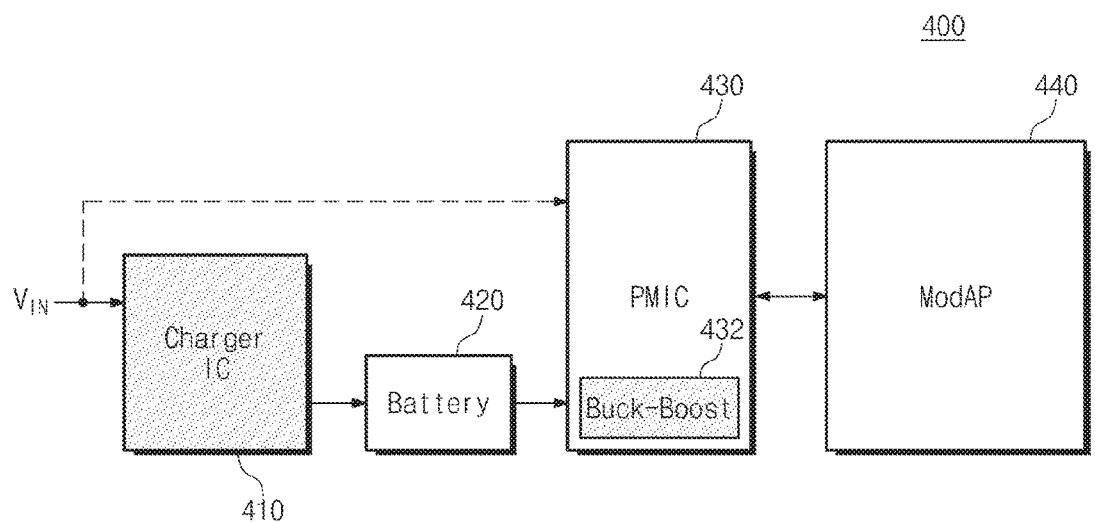
FIG. 14 is a block diagram illustrating another example embodiment of the electronic device having a charger integrated circuit according to an example embodiment of the inventive concepts.

FIG. 14 is a diagram illustrating another example embodiment of an electronic device having a charger integrated circuit according to an example embodiment of the inventive concepts. Referring to FIG. 14, an electronic device 400 may include a charger integrated circuit 410, a battery 420, a power management IC PMIC 430, and a modem application processor (ModAP) 440. The charger integrated circuit 410 may be implemented with the charger integrated circuit 100 shown in FIG. 1. The power management chip 430 may include a buck-boost circuit 432. At this time, the buck-boost circuit 432 may be implemented with a DC-DC converter 120 shown in FIG. 1.

On the other hand, referring to FIG. 14, the buck-boost circuit 432 may be inside the power management chip 430. However, the scope and spirit of the inventive concepts may not be limited thereto. A buck-booster circuit of the inventive concept may be between a battery and a power management chip.

Figure 15:
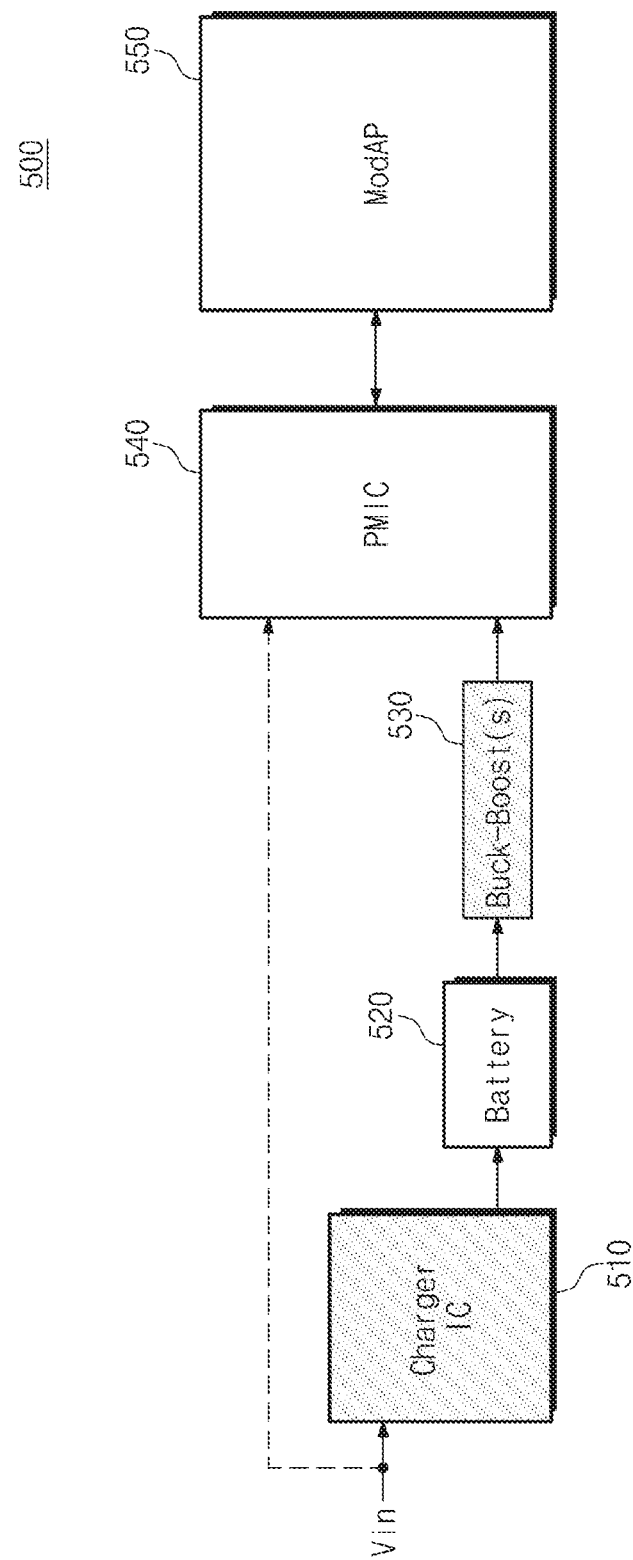
FIG. 15 is a block diagram illustrating another example embodiment of the electronic device having a charger integrated circuit according to an example embodiment of the inventive concepts.

FIG. 15 is a diagram illustrating another example embodiment of an electronic device having a charger integrated circuit according to an example embodiment of the inventive concepts. Referring to FIG. 15, an electronic device 500 may include a charger integrated circuit 510, a battery 520, a buck-boost circuit 530, a power management chip 540, and an integrated modem and application processor (ModAP) 540. The buck-booster circuit 530 may receive a battery voltage of the battery 520 and may output an output voltage required for the power management chip 540. The buck-boost circuit 530 may be implemented with a DC-DC converter 120 illustrated in FIG. 1.

Figure 16:
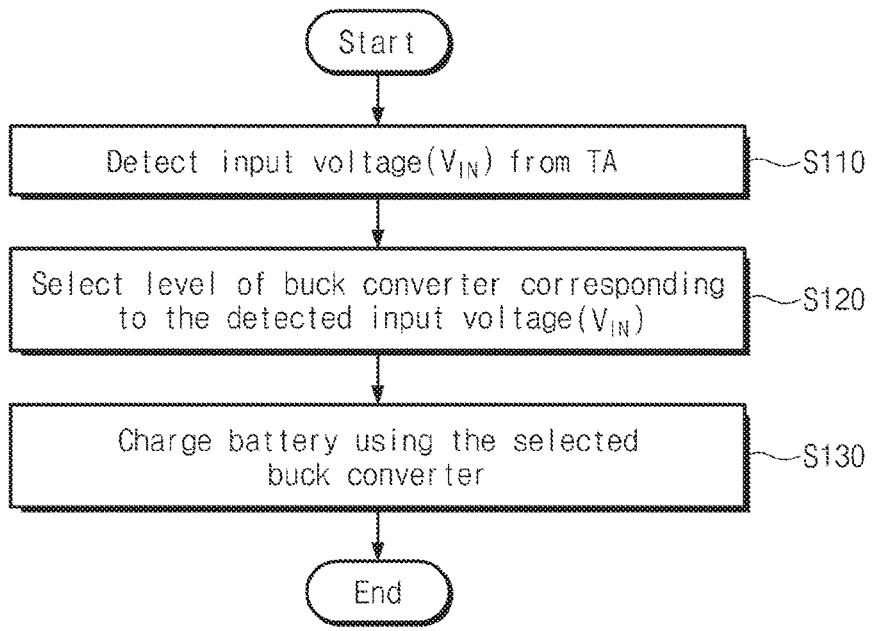
FIG. 16 is a flowchart illustrating an embodiment of a battery charging method of the charge integrated circuit according to an example embodiment of the inventive concepts.

FIG. 16 is a flowchart illustrating an example embodiment for a battery charging method of a charge integrated circuit according to an example embodiment of the inventive concepts. Referring to FIGS. 1 to 16, a battery charging method of the charge integrated circuit 100 (referring to FIG. 1) may be as follows. In step S110, an input voltage VIN may be detected from a charger (TA: a travel adapter). In step S120, a level of the buck converter corresponding to the detected input voltage VIN may be selected. For example, when a value of the input voltage VIN is greater than or equal to a predetermined value, a three-level buck converter may be selected; otherwise, a two-level buck converter may be selected. In step S130, a battery may be charged by using a selected buck converter. A battery may be charged in a current charging manner and then in a voltage charging manner.

A battery charging method of the charger integrated circuit according to an example embodiment of the inventive concepts may differently select a level of a buck converter based on a level of an input voltage VIN.

Figure 17:
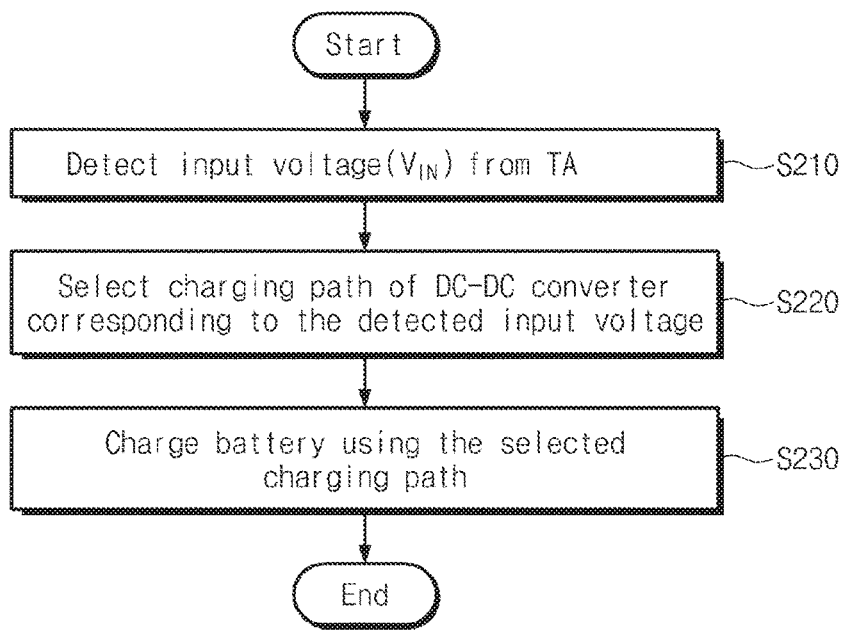
FIG. 17 is a flowchart illustrating an example embodiment of a battery charging method of the charger integrated circuit according to an example embodiment of the inventive concept.

FIG. 17 is a flow chart illustrating another example embodiment for a battery charging method of a charge integrated circuit according to an example embodiment of the inventive concepts. Referring to FIGS. 1 to 15, and 17, a battery charging method of the charger integrated circuit 100 (refer to FIG. 1) may be as follows. In step S210, an input voltage VIN may be detected from a charger (TA: a travelling adapter) (refer to FIG. 1). In step S220, a charging path of a buck converter corresponding to the detected input voltage VIN may be selected. For example, when a value of the input voltage VIN is greater than or equal to a predetermined value, a first charging path may be selected; otherwise, a second charging path may be selected. Here, in step S230, the first and second charge paths may be different from each other. A battery may be charged using the selected charging path.

According to an example embodiment of the inventive concepts, a battery charging method of a charger integrated circuit may differently select a path of the buck converter based on a charging level of the input voltage VIN.

On the other hand, the inventive concepts may also be applicable to an electronic device having a wireless charger.

Figure 18:
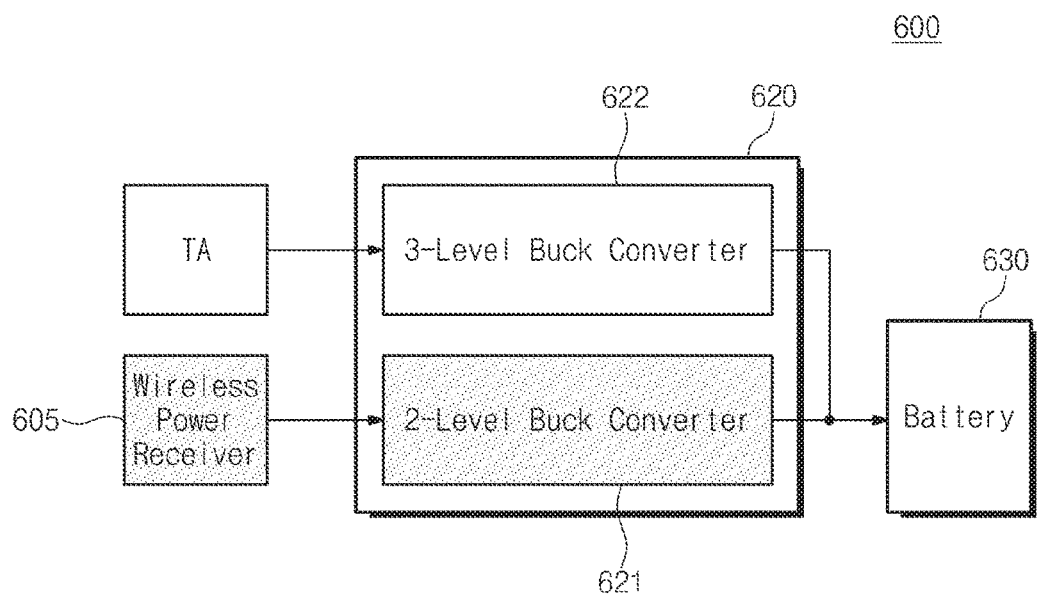
FIG. 18 is a block diagram illustrating an example embodiment of the electronic device having a wireless charger according to an example embodiment of the inventive concepts.

FIG. 18 is a diagram illustrating an example embodiment of the electronic device having a wireless charger according to an example embodiment of the inventive concepts. Referring to FIG. 18, an electronic device 600 may include a wireless charger 605, a charger integrated circuit 620, and a battery 630.

The wireless charger 605 may generate a power using a wireless charging manner. Here, the wireless charging manner may be at least one of various wireless charging manners such as magnetic induction, magnetic resonance, electromagnetic induction, non-radial wireless charging (witricity), and the like.

The charger integrated circuit 620 may include a two-level buck converter 621 and a three-level buck converter 622. The two-level buck converter 621 may receive a voltage generated from the wireless charger 605. The three-level buck converter 622 may receive a voltage from a charger (TA: a travel adapter). The three-level buck converter 622 may be switched to the two-level buck converter when an input voltage is relatively low, as described above with reference to FIGS. 1 to 17.

On the other hand, in FIG. 18, charging paths of the wireless charger 605 and the charger (TA: a travel adapter) may be illustrated as being independent of each other. However, the scope and spirit of the inventive concepts may not be limited thereto.

Figure 19:
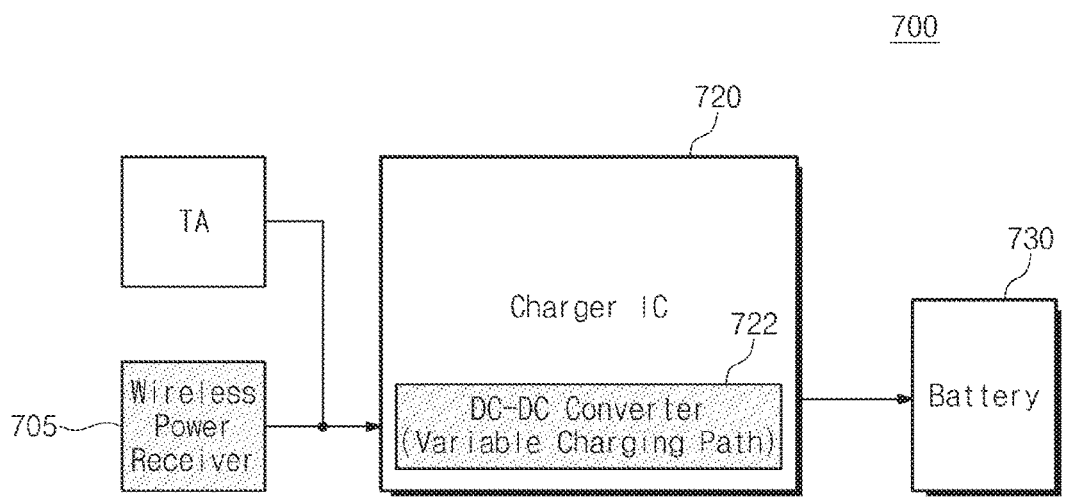
FIG. 19 is a block diagram illustrating an example embodiment of the electronic device having a wireless charger according to an example embodiment of the inventive concepts.

FIG. 19 is a diagram illustrating another embodiment of an electronic device having a wireless charger according to an example embodiment of the inventive concepts. Referring to FIG. 19, an electronic device 700 may include a wireless charger 705, a charger integrated circuit 720, and a battery 730. The electronic device 700 may be implemented such that charging paths of the wireless charger 605 and the charger (TA: a travel adapter) are shared. The charger integrated circuit 720 may be implemented with a charger integrated circuit 100 as described with reference to FIGS. 1 to 17.

Figure 20:
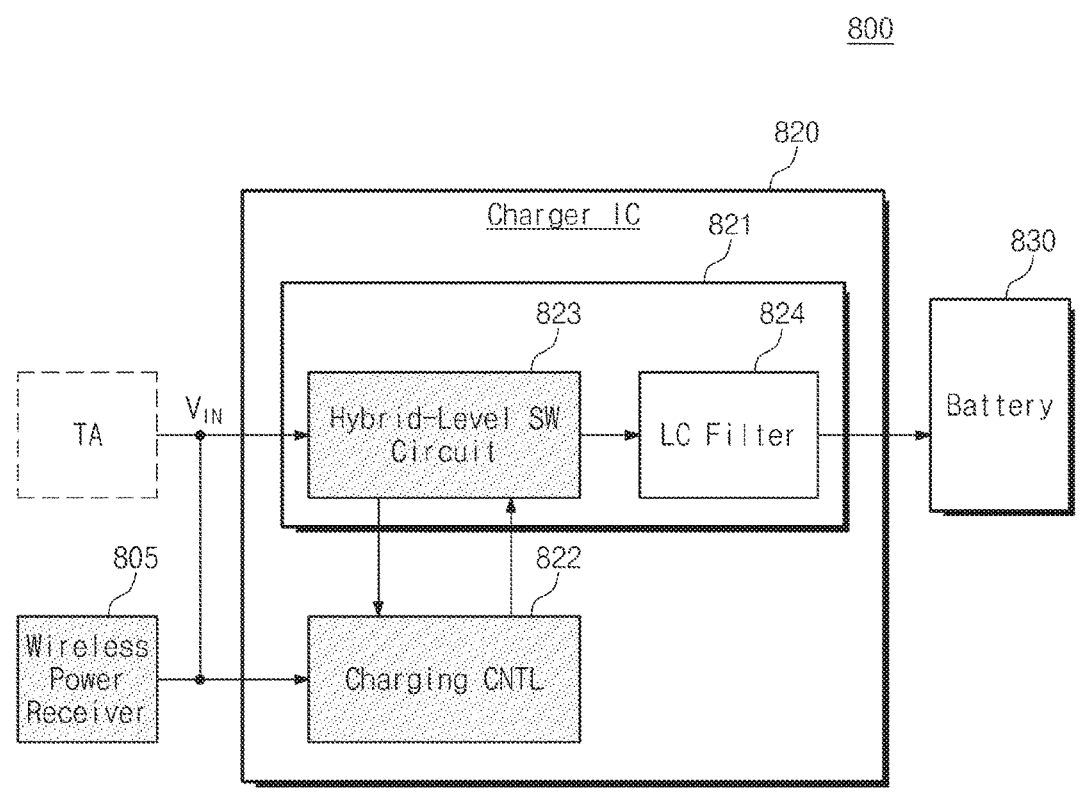
FIG. 20 is a block diagram illustrating an example embodiment of the electronic device having a wireless charger according to an example embodiment of the inventive concepts.

FIG. 20 is a diagram illustrating another embodiment of an electronic device having a wireless charger to an example embodiment of the inventive concepts. Referring to FIG. 20, an electronic device 800 may include a wireless charger 805, a charger integrated circuit 820, and a battery 830. The charger integrated circuit 820 may include a DC-DC converter 821 and a charging controller 822. The DC-DC converter 821 may include a hybrid level switch circuit 823 and a low-pass filter 824. The DC-DC converter 821 may be implemented with a DC-DC converter 120 illustrated in FIG. 4.

The charging controller 822 may detect a voltage level of the charger (TA) or wireless charger 805, and may generate a control signal based on the detected voltage level. At this time, the hybrid-level switch circuit 823 may operate as a two-level buck converter or a three-level buck converter in response to the control signal.

Figure 21:
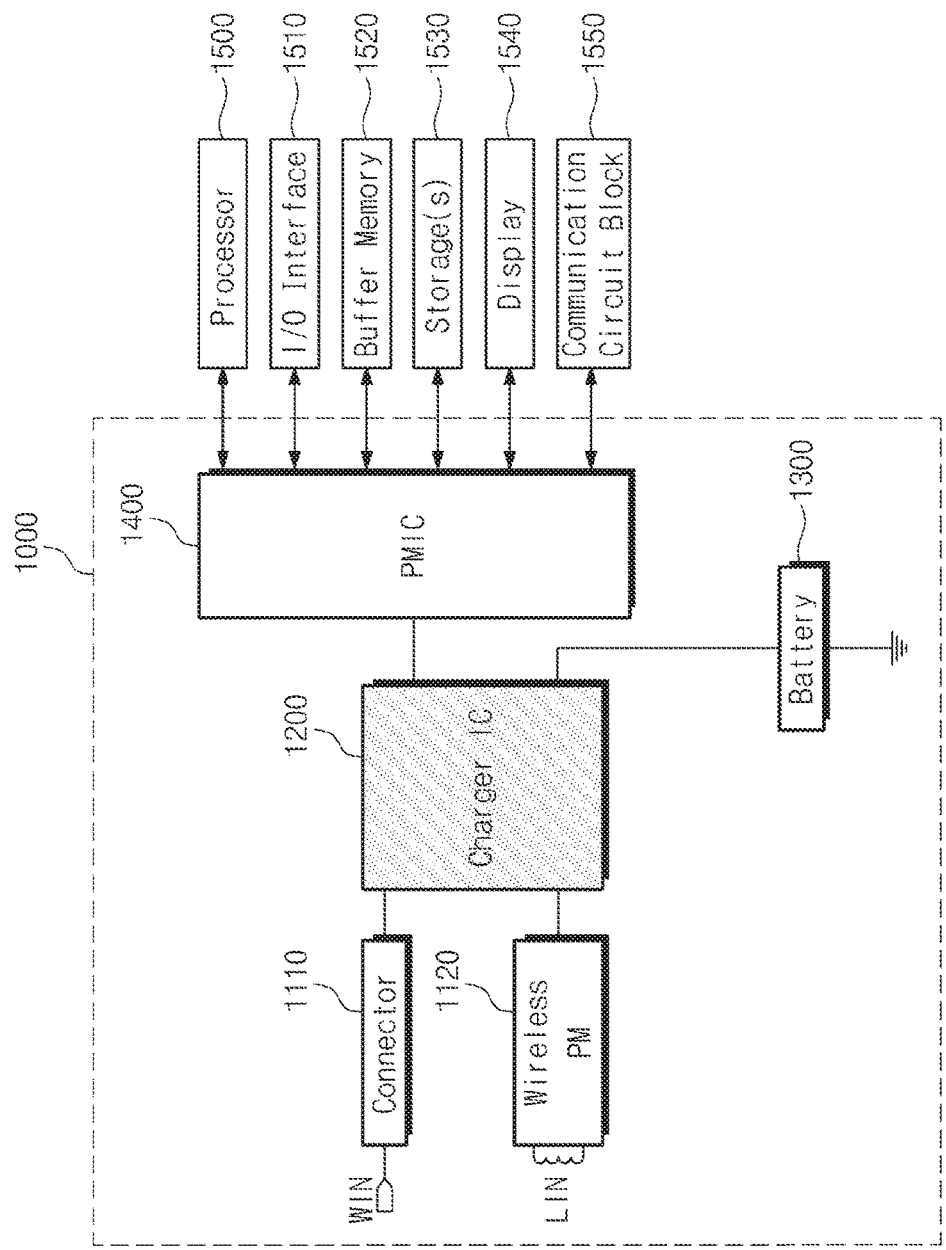
FIG. 21 is a block diagram illustrating a power system of the mobile device according to an example embodiment of the inventive concepts.

FIG. 21 is a block diagram illustrating a power system 1000 in a mobile device according to an example embodiment of the inventive concepts. Referring to FIG. 21, a power system 1000 may include a connector 1110, a wireless power manager 1120, a charger integrated circuit 1200, a battery 1300, and a main power manager 1400. The power system 1000 illustrated in FIG. 21 may further include components not shown in FIG. 21. Alternatively, the power system 1000 may not include one or more of the components shown in FIG. 21.

The power system 1000 may be used to provide a power to the mobile device. The power system 1000 may receive a power supplied from a power source connected in a wire manner through a conversion device such as an adapter. Alternatively, the power system 1000 may receive the power supplied from the power source wirelessly connected by resonance of an inductor. The power system 1000 may properly convert a received power. The power system 1000 may supply the converted power to the components of a mobile electronic device.

For example, the connector 1110 may be connected to a conversion device such as an adapter through a wired input terminal WIN. The connector 1110 may receive a power supplied from a power source connected in a wired manner. The connector 1110 may properly convert a supplied power and may provide the converted power to the charger integrated circuit 1200.

For example, the wireless power manager 1120 may be coupled to an input inductor LIN. The input inductor LIN may resonate with a resonant inductor (not shown) of a wireless power transmitter. The wireless power manager 1120 may receive a power supplied from the power source connected wirelessly by resonance between the input inductor LIN and a transmitting inductor. The wireless power manager 1120 may properly convert a supplied power and may provide the converted power to the charger integrated circuit 1200.

The charger integrated circuit 1200 may operate in a battery power mode BPM, a charging mode CM, and a boost mode BM. For example, when a power is not supplied through the connector 1110 and the wireless power manager 1120, the battery power mode may operate. In the battery power mode, the charge integrated circuit 1200 may be provided with a power from the battery 1300. The charger integrated circuit 1200 may properly convert a power supplied from the battery 1300, and may provide the converted power to the main power manager 1400.

The charger integrated circuit 1200 may receive a power supplied from at least one of the connectors 1110, and the wireless power manager 1120. For example, when a power is supplied by at least one of the connector 1110 and the wireless power manager 1120, the charging mode may operate. In the charging mode, the charger integrated circuit 1200 may properly convert a power received through the connector 1110, or the wireless power manager 1120. The charger integrated circuit 1200 may charge the battery 1300 using the converted power. Furthermore, the charge integrated circuit 1200 may provide the converted power to the main power manager 1400.

For example, a peripheral device (e.g., a keyboard, speakers, etc.) used to assist a use of a mobile electronic device may be connected to the charger integrated circuit 1200 through the connector 1110. The charger integrated circuit 1200 may operate at a boost mode to provide a power to the peripheral device. In the boost mode, the charger integrated circuit 1200 may boost an output voltage of the battery 1300, and may provide the increased voltage to the peripheral device. If necessary, in the boost mode, the charger integrated circuit 1200 may properly convert a power supplied from the battery 1300 and may provide the converted power to the main power manager 1400.

The structures and operations of the charger integrated circuit 1200 may be described in FIGS. 1 to 20 according to an example embodiment of the inventive concepts.

The main power manager 1400 may be provided with a power supplied from the charger integrated circuit 1200. For example, the main power manager 1400 may convert a voltage supplied from the charge integrated circuit 1200 into a stable voltage. The main power manager 1400 may provide the stable voltage to other components of a mobile electronic device. For example, a processor 1500, an input/output interface 1510, a memory 1520, a storage 1530, a display 1540, and a communication circuit block 1550 included in the mobile electronic device may operate using the stable voltage supplied from the main power manager 1400.

For example, each of the wireless power manager 1120, the charger integrated circuit 1200, and the main power manager 1400 may be implemented as an integrated circuit chip. Each of the wireless power manager 1120, the charge integrated circuit 1200, and the main power manager 1400 may be mounted using various types of semiconductor packages. For example, each of the wireless power manager 1120, the charge integrated circuit 1200, and the main power manager 1400 may be mounted using packages such as, including but not limited to, a package on package (POP), a ball grid arrays (BGAs), a chip scale packages (CSPs), a plastic leaded chip carrier (PLCC), a plastic dual in-line package (PDIP), a die in waffle pack, a die in wafer form, a chip on board (COB), a ceramic dual in-line package (CERDIP), a metric quad flat pack (MQFP), a thin quad flat pack (TQFP), a small outline integrated circuit (SOIC), a shrink small outline package (SSOP), a thin small outline package (TSOP), a system in package (SIP), a multichip package (MCP), a wafer-level fabricated package (WFP), and a wafer-level processed stack package (WSP).

Figure 22:
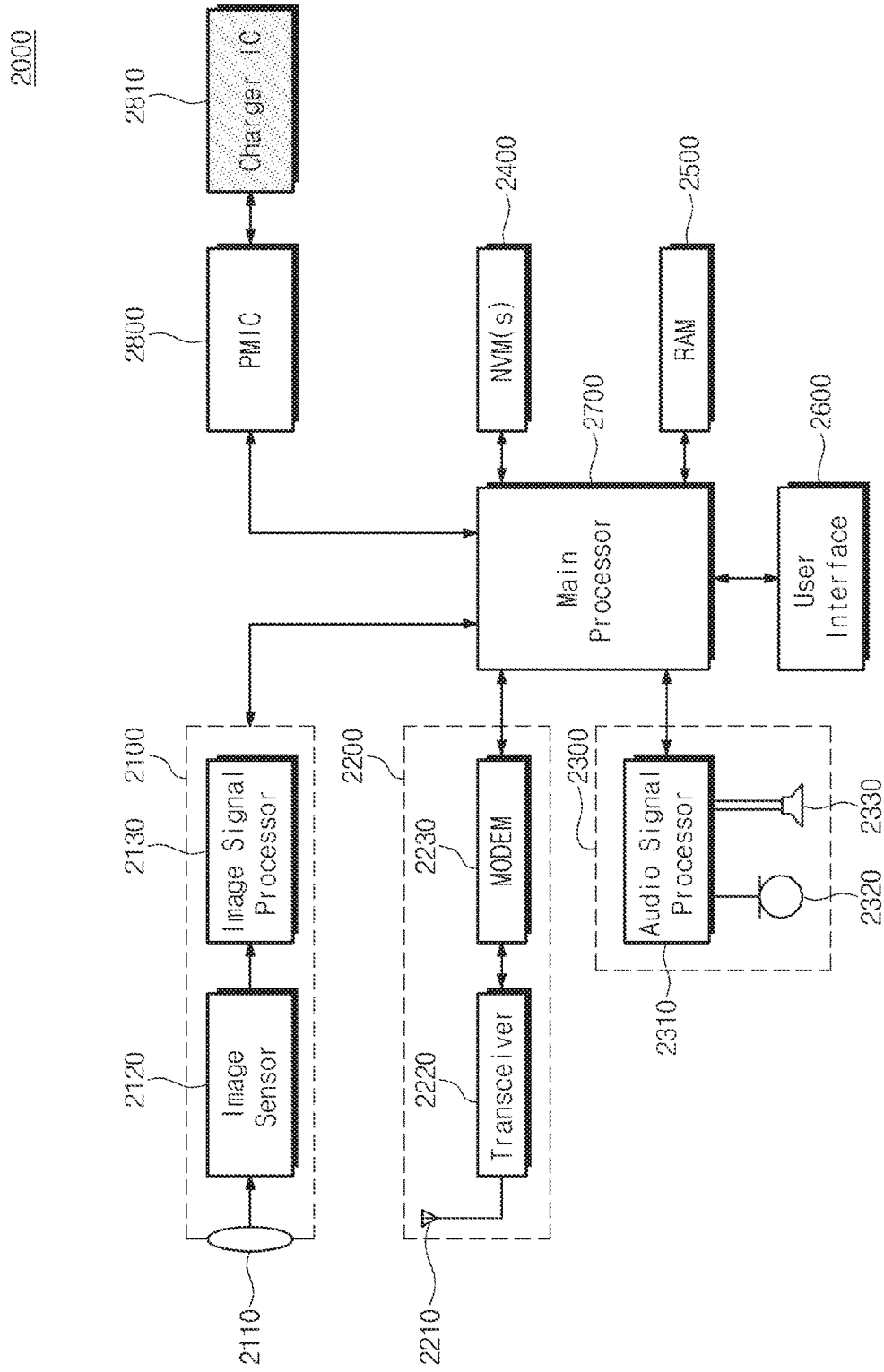
FIG. 22 is a block diagram illustrating a mobile device having a charger integrated circuit according to an example embodiment of the inventive concepts.

FIG. 22 is a block diagram illustrating a mobile device having a charger integrated circuit according to an example embodiment of the inventive concepts. Referring to FIG. 22, a mobile device 2000 may include an image processor 2100, a wireless communication device 2200, an audio processor 2300, a non-volatile memory 2400, a random access memory (RAM) 2500, a user interface 2600, a main processor 2700, a power management IC (PMIC) 2800, and a charger integrated circuit 2810. In an example embodiment of the inventive concepts, the mobile electronic device 2000 may be a portable terminal, a portable personal assistant (PDA), a personal media player (PMP), a digital camera, a smart phone, a tablet and a wearable device.

The image processor 2100 may be provided with a light through a lens 2110. An image sensor 2120 and an image signal processor 2130 included in the image processor 2100 may generate an image based on a received light.

A wireless communication device 2200 may include an antenna 2210, a transceiver 2220, and a modem 2230. The wireless communication device 2200 may communicate with an outside of an mobile electronic device 2000 based on a variety of wireless communication protocols such as, including but not limited to, a Long Term Evolution (LTE), a world interoperability for microwave access (WiMax), a global system for mobile communication (GSM), a code division multiple access (CDMA), a blue-tooth, a near field communication (NFC), a wireless fidelity (WiFi), and a radio frequency identification (RFID).

The audio processor 2300 may process an audio signal using an audio signal processor 2310. The audio processor 2300 may receive an audio input through a microphone 2320 or may provide an audio output through a speaker.

The nonvolatile memory 2400 may store the data required a storage regardless of a power supply. For example, the nonvolatile memory 2400 may be, including but not limited to, a NAND flash memory, a vertical NAND flash memory (VNAND), a NOR flash memory, a resistive random access memory (RRAM), a phase change memory (PRAM), a magneto-resistive random access memory (MRAM), a ferroelectric random access memory (FRAM), a spin transfer torque random access memory (STT-RAM), or the like.

In an example embodiment of the inventive concepts, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In an example embodiment of the inventive concepts, the 3D memory array includes vertical NAND strings that are vertically oriented such that at least one memory cell is located over another memory cell. The at least one memory cell may comprise a charge trap layer. Each vertical NAND string may include at least one select transistor located over memory cells, the at least one select transistor having the same structure with the memory cells and being formed monolithically together with the memory cells. The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648. A non-volatile memory device may be applicable to a charge trap flash (CTF) in which a charge storage layer is formed of an insulation layer, as well as a flash memory in which a charge storage layer is formed of a conductive floating gate.

The RAM 2500 may store data for use in an operation of the mobile electronic device 2000. For example, the RAM 2500 may be used as a working memory, an operation memory, a buffer memory, or the like of the mobile electronic device 2000. The RAM 2500 may temporarily store data processed, or to be processed by the main processor 2700.

The user interface 2600 may interface a user and the mobile electronic device 2000 through a control of the main processor. For example, the user interface 2600 may include an input interface such as a keyboard, a keypad, buttons, a touch panel, a touch screen, a touch pad, a touch ball, a camera, a microphone, gyroscope sensors, vibration sensors, and the like. In addition, the user interface 2600 may include an output interface such as a display device, a motor and the like. For example, the display device may include, but not limited to, one or more of a liquid crystal display LCD, a light emitting diode LED display, an organic LED display, and an active matrix OLED display.

The main processor 2700 may control an overall operation of the mobile electronic device 2000. The image processor 2100, the wireless communication device 2200, the audio processor 2300, the nonvolatile memory 2400, and the RAM 2500 may perform a user command supplied through a user interface in response to a control of the main processor 2700. Alternatively, the image processor 2100, the wireless communication device 2200, the audio processor 2300, the nonvolatile memory 2400, and the RAM 2500 may provide a service to a user through the user interface in response to the control of the main processor 2700. The main processor 2700 may be implemented with a system on chip SOC. For example, the main processor 2700 may include an application processor (AP).

The power management chip 2800 may manage a power used for the operation of the mobile electronic device 2000.

A charger integrated circuit 2810 may be implemented in accordance with example embodiments of the inventive concepts described in reference to FIGS. 1 through 20. The charger integrated circuit 2810 may include one or more charging paths. The charger integrated circuit 2810 may operate at one of a battery power mode, a charge mode and a boost mode. An explanation of the embodiments of the inventive concept may be omitted for simplicity.

On the other hand, in FIGS. 1 through 22, the charger integrated circuit of the inventive concepts may be implemented to vary the charging path based on to a level of an input voltage VIN. However, the scope and spirit of the inventive concepts may not be limited thereto. The charging path may vary according to a variety of environment information such as an operating mode, an operating temperature, an operating current, a noise and the like.

While the inventive concepts have been described with reference to example embodiments, it will be apparent to those skilled in the art that various changes and modifications may be made without departing from the spirit and scope of the inventive concepts. Therefore, it should be understood that the above embodiments are not limiting, but illustrative.

The units and/or modules described herein may be implemented using hardware components, software components, or a combination thereof. For example, the hardware components may include microcontrollers, memory modules, sensors, amplifiers, band-pass filters, analog to digital converters, and processing devices, or the like. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors, multi-core processors, distributed processing, or the like.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, or computer storage medium or device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of some example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A charger integrated circuit comprising:
a DC-DC converter configured to receive an input voltage and generate an output voltage through a switching operation for charging a battery; and
a charging controller configured to control the switching operation such that the output voltage is supplied to the battery through different charging paths according to a level of the input voltage, wherein either,
the output voltage is supplied to the battery through at least a first charging path to generate the output voltage higher than the input voltage, or
the output voltage is supplied to the battery through at least two different second charging paths to generate the output voltage lower than the input voltage.

2. The charger integrated circuit of claim 1, wherein the DC-DC converter includes a boost converter, and the boost converter is configured to generate the output voltage higher than the input voltage.

3. The charger integrated circuit of claim 1, wherein the DC-DC converter includes,
a two-level buck converter configured to generate the output voltage by switching between the input voltage and 0V; and
a three-level buck converter configured to generate the output voltage by switching between the input voltage, a half of the input voltage, and 0 V.

4. The charger integrated circuit of claim 3, wherein the DC-DC converter configured to operate as the two-level buck converter when a value of the input voltage is less than a predetermined value.

5. The charger integrated circuit of claim 1, wherein the DC-DC converter includes,
a hybrid-level switch circuit configured to,
receive the input voltage,
perform the switching operation in response to a control signal, and
generate the output voltage; and
a low pass filter configured to smooth the output voltage,
wherein different switching operations are performed according to the level of the input voltage.

6. The charger integrated circuit of claim 5, wherein
a first switching operation is performed in which the DC-DC converter is configured to operate as a two-level converter, if a value of the input voltage is less than a predetermined value,
a second switching operation is performed in which the DC-DC converter is configured to operate as a three-level converter, if value of the input voltage is greater than or equal to the predetermined value, and
a first charging path formed is different from a second charging path formed, the first charging path corresponding to the first switching operation, the second charging path corresponding to the second switching operation.

7. The charger integrated circuit of claim 1, wherein the DC-DC converter includes,
a hybrid-level switch circuit configured to receive the input voltage and perform a two-level or three-level switching operation in response to a first control signal to a fourth control signal;
an inductor configured to receive an output node voltage of the hybrid-level switch circuit; and
a capacitor connected between the inductor and a ground terminal, and wherein
the hybrid-level switch circuit includes,
a first transistor connecting an input terminal and a first node, the first transistor connected to receive the input voltage in response to the first control signal;
a second transistor connecting the first node and the output node in response to the second control signal;
a third transistor connecting the output node and a second node in response to the third control signal;
a fourth transistor connecting the second node and the ground terminal in response to the fourth control signal;
a comparison capacitor connected between the first node and the second node; and
a comparator configured to amplify a voltage between the first node and the second node to output a comparison voltage.

8. The charger integrated circuit of claim 7, wherein the charging controller includes,
a control factor selector configured to receive at least one of the input voltage, an input current, a temperature and a battery voltage;
an amplifier configured to output an error voltage by comparing a factor voltage with a reference voltage; and
a control signal generator configured to generate the first to the fourth control signals corresponding to the level of the input voltage in response to the error voltage.

9. The charger integrated circuit of claim 7, wherein the hybrid-level switch circuit includes,
a PMOS transistor connecting the input terminal and the first node in response to an auxiliary PMOS control signal; and
an NMOS transistor connecting the second node and the ground terminal in response to an auxiliary NMOS control signal.

10. The charger integrated circuit of claim 7, wherein the charging controller includes a level selector, the level selector includes,
a first comparator configured to generate a conversion mode enable signal via comparing the input voltage with a reference voltage; and
a second comparator configured to generate a three-level enable signal via comparing the input voltage with the comparison voltage in response to the conversion mode enable signal.

11. The charger integrated circuit of claim 1, wherein switching frequencies corresponding to the charging paths are different from each other.

12. An electronic device comprising:
a battery; and
a charger integrated circuit configured to receive an input voltage and generate an output voltage for charging the battery through at least two paths, the at least two paths including at least two buck paths, and
wherein the charger integrated circuit includes a DC-DC converter, the DC-DC converter is configured to operate, in response to a level of the input voltage, as at least one of
a two-level buck converter configured to generate the output voltage by switching between the input voltage and 0V, and
a three-level buck converter configured to generate the output voltage by switching between the input voltage, a half of the input voltage, and 0V.

13. The electronic device of claim 12, wherein the DC-DC converter includes,
a hybrid-level switch circuit configured to receive the input voltage and perform a two-level or three-level switching operation in response to first control signal to fourth control signal;
an inductor configured to receive an output node voltage of the hybrid-level switch circuit; and
a capacitor connected between the inductor and a ground terminal, and wherein
the hybrid-level switch circuit includes,
a first transistor connecting an input terminal and a first node, the first node connected to receive the input voltage in response to the first control signal;
a second transistor connecting the first node and the output node in response to the second control signal;
a third transistor connecting the output node and a second node in response to the third control signal;
a fourth transistor connecting the second node and the ground terminal in response to the fourth control signal;
a comparison capacitor connected between the first node and the second node; and
a comparator configured to amplify a voltage between the first node and the second node to output a comparison voltage.

14. The electronic device of claim 12, further including,
a power management chip configured to receive a battery voltage from the battery to generate and manage power supply voltages required for driving.

15. The electronic device of claim 12, further including,
an application processor;
a first power management chip configured to receive a battery voltage from the battery to manage at least one first power required for driving the application processor;
a modem chip configured to perform wired and/or wireless communication; and
a second power management chip configured to receive the battery voltage from the battery to manage at least one second power required for driving the modem chip.

16. A charger integrated circuit for charging a battery comprising:
a DC-DC converter configured to receive an input voltage and generate an output voltage which is supplied to the battery through a switching operation, the DC-DC converter includes a plurality of charging paths where the plurality of charging paths are changed through the switching operation; and
a charging controller configured to control the switching operation in order to output the output voltage, via at least one of the plurality of charging paths, at a level different from the input voltage, the plurality of charging paths including a first charging path through a two-level buck converter and a second charging path through a three-level buck converter.

17. The charger integrated circuit of claim 16, wherein the controller is configured to, select a first charging path of the plurality of charging paths if value of the input voltage is less than a predetermined value; and
    select a second charging path of the plurality of charging paths if value of the input voltage is greater than or equal to the predetermined value.

18. The charger integrated circuit of claim 16, wherein the DC-DC converter configured to operate as the two-level buck converter when a value of the input voltage is less than a predetermined value,
    the DC-DC converter configured to operate as the three-level buck converter when the value of the input voltage is greater than or equal to the predetermined value, and
    the two-level buck converter and the three-level buck converter are independent of each other or a shared component of each other.

19. The charger integrated circuit of claim 16, wherein the DC-DC converter includes a hybrid-level switch circuit and a low-pass filter, the hybrid-level switch includes a first charging path and a second charging path, the first charging path configured to operate as a two-level buck converter and the second charging path configured to operate as a three-level buck converter.

20. The charger integrated circuit of claim 19, wherein the hybrid-level switch circuit configured to receive the input voltage and
    perform the switching operation in response to a control signal, and
    the low-pass filter includes an inductor and a capacitor, the low-pass filter configured to smooth the output voltage.

* * * * *